(12) United States Patent
Cha et al.

(10) Patent No.: US 10,560,677 B2
(45) Date of Patent: Feb. 11, 2020

(54) THREE-DIMENSIONAL IMAGE PROCESSING APPARATUS AND ELECTRIC POWER CONTROL METHOD OF THE SAME

(71) Applicant: LG ELECTRONICS INC., Seoul (KR)

(72) Inventors: Hongrae Cha, Seoul (KR); Kwangyeol Choi, Seoul (KR); Taesoo Park, Seoul (KR); Jaekwang Lee, Seoul (KR); Wooyoung Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 614 days.

(21) Appl. No.: 13/673,216

(22) Filed: Nov. 9, 2012

(65) Prior Publication Data

US 2013/0120535 A1    May 16, 2013

(30) Foreign Application Priority Data

Nov. 11, 2011    (KR) .......................... 10-2011-0117642

(51) Int. Cl.
*H04N 13/00*    (2018.01)
*H04N 13/117*    (2018.01)
(Continued)

(52) U.S. Cl.
CPC ......... *H04N 13/117* (2018.05); *G02B 5/1814* (2013.01); *G06F 3/0346* (2013.01); *G06K 9/00281* (2013.01)

(58) Field of Classification Search
CPC ............. G06K 9/00281; G02B 5/1814; H04N 13/0409; G06F 3/0346
(Continued)

(56) References Cited

U.S. PATENT DOCUMENTS 5,424,553 A * 6/1995 Morton .......................... 250/548
5,959,664 A * 9/1999 Woodgate ....................... 348/59
(Continued)

FOREIGN PATENT DOCUMENTS

CN    101210846    7/2008
CN    101984670    3/2011
(Continued)

OTHER PUBLICATIONS

European Office Action issued in related Application No. 12007508.0 dated May 7, 2014.
(Continued)

*Primary Examiner* — Sath V Perungavoor
*Assistant Examiner* — Daniel Chang
(74) *Attorney, Agent, or Firm* — KED & Associates LLP

(57) ABSTRACT

A three-dimensional image processing apparatus and a method of controlling power of same are provided. The three-dimensional image processing apparatus may include a display, a three-dimensional image filter disposed a prescribed distance from the display to adjust optical paths of the displayed view images, a camera configured to capture an image of a user, an ambient light sensor, and a controller configured to control the view images, the three-dimensional image filter, or the camera. The controller may determine a position of the user based on the captured image and adjust a perceived three-dimensional view of the view images based on the determined position of the user. Moreover, the controller may control an operational state of the camera and the at least one process based on the determined position of the user or a detected amount of ambient light.

15 Claims, 23 Drawing Sheets

(51) Int. Cl.
*G06F 3/0346* (2013.01)
*G02B 5/18* (2006.01)
*G06K 9/00* (2006.01)

(58) Field of Classification Search
USPC ..... 250/548; 345/156, 697; 348/59, 164, 51, 348/222.1; 359/462, 19; 455/556.1; 713/320; 463/32; 712/1
See application file for complete search history.

(56) References Cited

U.S. PATENT DOCUMENTS

| | | | | |
|---|---|---|---|---|
| 6,075,557 | A * | 6/2000 | Holliman | G02B 27/225 348/51 |
| 6,377,295 | B1 * | 4/2002 | Woodgate | G02B 27/0093 348/59 |
| 2002/0011987 | A1 * | 1/2002 | Kitazawa | 345/156 |
| 2004/0075812 | A1 * | 4/2004 | Kardon | A61B 3/0058 351/206 |
| 2006/0136762 | A1 * | 6/2006 | Yoshioka et al. | 713/320 |
| 2006/0139447 | A1 * | 6/2006 | Unkrich | H04N 13/0409 348/51 |
| 2007/0159673 | A1 * | 7/2007 | Freeman | G02B 5/1814 359/19 |
| 2009/0181719 | A1 * | 7/2009 | Cho | 455/556.1 |
| 2010/0079508 | A1 * | 4/2010 | Hodge | G06F 3/013 345/697 |
| 2010/0295958 | A1 * | 11/2010 | Larsson | G06F 3/0346 348/222.1 |
| 2011/0134251 | A1 * | 6/2011 | Kim et al. | 348/164 |
| 2011/0157696 | A1 * | 6/2011 | Bennett et al. | 359/462 |
| 2012/0088581 | A1 * | 4/2012 | Mao | G06K 9/00281 463/32 |
| 2012/0120203 | A1 | 5/2012 | Chen et al. | 348/51 |

FOREIGN PATENT DOCUMENTS

| | | |
|---|---|---|
| EP | 1 383 343 | 1/2004 |
| JP | H10-232626 | 9/1998 |
| KR | 10-2009-0016251 | 2/2009 |
| KR | 10-2011-0062484 | 6/2011 |
| WO | WO 2011/001372 | 1/2011 |

OTHER PUBLICATIONS

Chinese Office Action issued in Application No. 201210444042.5 dated Jun. 23, 2014.
European Search Report issued in related Application No. 12007508.0, dated Sep. 6, 2013.
Korean Office Action dated Dec. 6, 2017 issued in Application No. 10-2011-0117642 (with English Translation).

* cited by examiner

THREE-DIMENSIONAL IMAGE PROCESSING APPARATUS AND ELECTRIC POWER CONTROL METHOD OF THE SAME

CROSS-REFERENCE TO RELATED APPLICATION(S)

This application claims priority under 35 U.S.C. § 119 to Korean Application No. 10-2011-0117642 filed in Korea on Nov. 11, 2011, whose entire disclosure(s) is/are hereby incorporated by reference.

BACKGROUND

1. Field

The present disclosure relates to a three-dimensional image processing apparatus and an electric power control method of the same.

2. Background

In addition to content which displays a two-dimensional image based on a two-dimensional image signal, content which displays a three-dimensional image based on a three-dimensional image signal has been planned and produced as broadcast content. A method of displaying a three-dimensional image may use a principle of binocular disparity by which a viewer experiences a three-dimensional effect due to binocular disparity.

Such a method may be classified as a shutter glass method, a glassless method, or a full three-dimensional method. In particular, in the glassless method, a region in which a user can view a three-dimensional image without image flipping and cross-talk is limited. Consequently, it is necessary to control display of a three-dimensional image based on a position of the user. As broadly described and embodied herein, a three-dimensional image processing apparatus and an electric power control method of the same may move a sweet spot region to correspond to a position of a user, thereby minimizing power consumption.

BRIEF DESCRIPTION OF THE DRAWINGS

The embodiments will be described in detail with reference to the following drawings in which like reference numerals refer to like elements, wherein.

DETAILED DESCRIPTION

Figure 1:
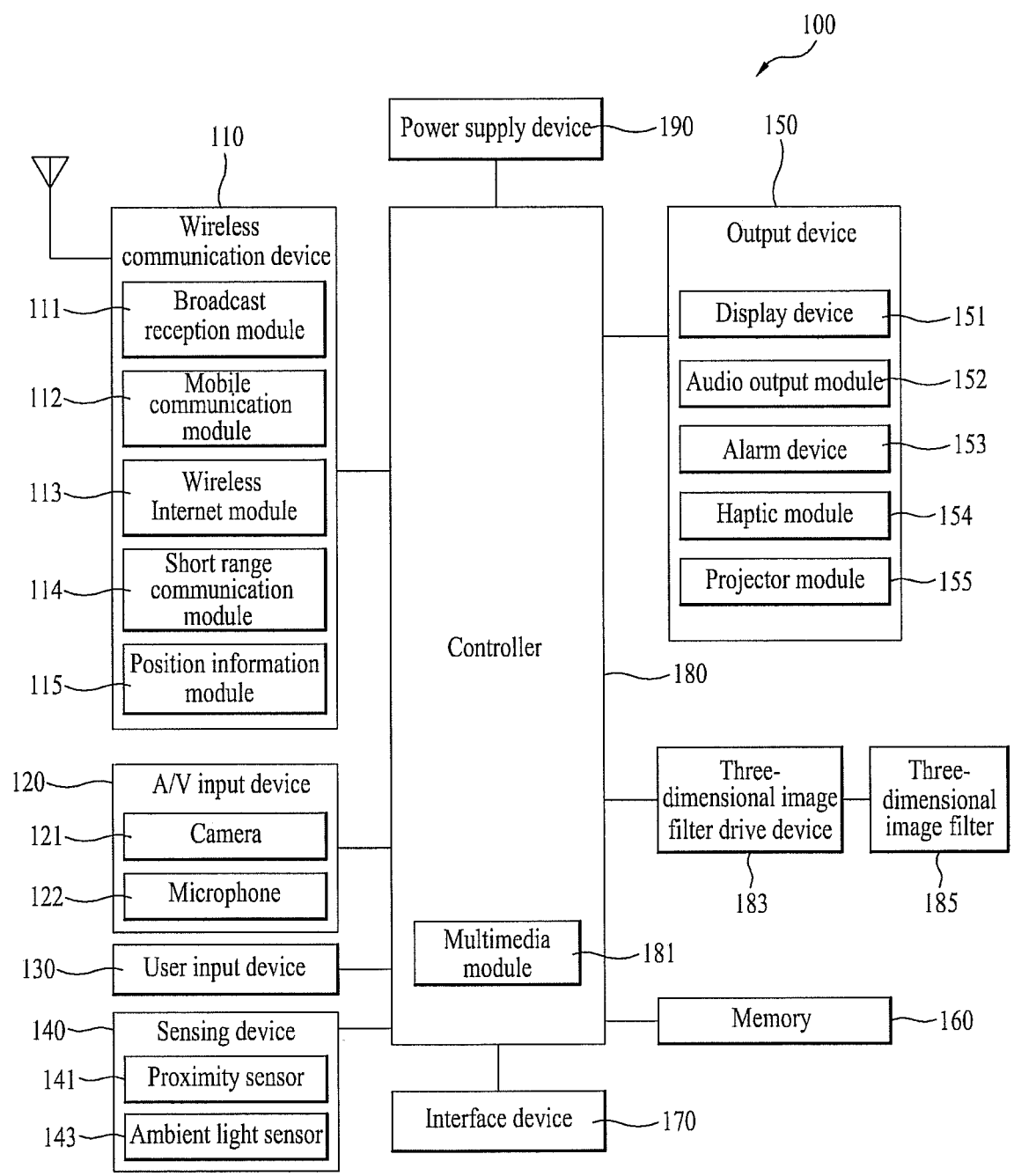
FIG. 1 is a block diagram of a three-dimensional image processing apparatus according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts.

Hereinafter, the exemplary embodiments of the present disclosure will be described with reference to the accompanying drawings. The configuration and action of the present disclosure shown in the drawings and described with reference to the drawings will be described as at least one embodiment; however, the technical idea and the core configuration and action of the present disclosure are not limited thereto.

Although the terms used in the present disclosure are selected from generally known and widely used terms in consideration of function in the present disclosure, terms used herein may be varied depending on operator's intention or customs in the art, emergence new technology, or the like. Also, some of the terms mentioned in the description of the present disclosure have been selected by the applicant at his or her discretion, the detailed meanings of which are described in relevant parts of the description herein. Therefore, the terms used in the present disclosure should be defined not based on the names of the terms but based on the meanings of the terms and the detailed description of the present disclosure.

A three-dimensional image processing apparatus described in this specification may include mobile terminals, such as a mobile phone, a smart phone, a laptop computer, a digital broadcasting terminal, a personal digital assistant (PDA), a portable multimedia player (PMP), a navigator, or the like. Although embodiments of the present disclosure described in this specification are applied to such mobile terminals, it will be apparent to those skilled in the art that the embodiments of the present disclosure can be applied to stationary terminals, such as a digital TV or a desktop computer.

FIG. 1 is a block diagram of a three-dimensional image processing apparatus according to an embodiment of the present disclosure. The three-dimensional image processing apparatus 100 may include a wireless communication device 110, an audio/video (A/V) input device 120, a user input device 130, a sensing device 140, an output device 150, a memory 160, an interface device 170, a controller 180, a three-dimensional image filter drive device 183, a three-dimensional image filter 185 and a power supply device 190. The components shown in FIG. 1 are not indispensible. Consequently, the three-dimensional image processing apparatus may include more than or less than the components as listed above.

Hereinafter, the above-mentioned components will be described one by one.

The wireless communication device 110 may include one or more modules to enable wireless communication between the three-dimensional image processing apparatus 100 and a wireless communication system or between the three-dimensional image processing apparatus 100 and a network in which the three-dimensional image processing apparatus 100 is located. For example, the wireless communication device 110 may include a broadcast reception module 111, a mobile communication module 112, a wireless Internet module 113, a short range communication module 114 and a position information module 115.

The broadcast reception module 111 receives broadcast signals and/or broadcast-related signals from an external broadcast management server through broadcast channels. The broadcast channels may include satellite channels and terrestrial channels. The broadcast management server may be a server to generate broadcast signals and/or broadcast-related information and to transmit the generated broadcast signals and/or broadcast-related information or a server to receive pre-generated generate broadcast signals and/or broadcast-related information and to transmit the received broadcast signals and/or broadcast-related information to terminals. The broadcast signals may include TV broadcast signals, radio broadcast signals and data broadcast signals. In addition, the broadcast signals may include broadcast signals formed by combining data broadcast signals with TV broadcast signals or radio broadcast signals. Also, the TV broadcast signals may include two-dimensional image broadcast signals and three-dimensional image broadcast signals.

The broadcast-related information may be information regarding broadcast channels, broadcast programs, broadcast service providers, or another appropriate type of information. The broadcast-related information may be provided through a mobile network. In this case, the broadcast-related information may be received by the mobile communication module 112.

The broadcast-related information may be provided in various forms. For example, the broadcast-related information may be provided in the form of an electronic program guide (EPG) of digital multimedia broadcasting (DMB) or an electronic service guide (ESG) of digital video broadcast-handheld (DVB-H).

The broadcast reception module 111 may receive digital broadcast signals using digital broadcasting systems, such as digital multimedia broadcasting-terrestrial (DMB-T), digital multimedia broadcasting-satellite (DMB-S), media forward link only (MediaFLO), digital video broadcast-handheld (DVB-H), and integrated services digital broadcast-terrestrial (ISDB-T). Of course, the broadcast reception module 111 may be configured to be suitable for the above-mentioned digital broadcasting systems and other different broadcasting systems.

Broadcast signals and/or broadcast-related information received by the broadcast reception module 111 may be stored in the memory 160.

The mobile communication module 112 may transmit and receive wireless signals to and from at least one selected from among a base station, an external terminal and a server via a mobile communication network. The wireless signals may include speech call signals, video communication call signals or various forms of data based on transmission and receipt of text/multimedia messages.

The wireless Internet module 113 is a module for wireless Internet connection. The wireless Internet module 113 may be mounted inside or outside the three-dimensional image processing apparatus 100. Wireless LAN (WLAN), wireless fidelity (Wi-Fi), wireless broadband (WiBro), world interoperability for microwave access (WiMax), high speed downlink packet access (HSDPA) or the like may be used as wireless Internet technology.

The short range communication module 114 is a module for short range communication. Bluetooth, radio frequency identification (RFID), infrared data association (IrDA), ultra wideband (UWB), ZigBee or the like may be used as short range communication technology.

The position information module 115 is a module to acquire positions of the three-dimensional image processing apparatus. A representative model of the position information module 115 is a global position system (GPS) module.

The AN input device 120 is provided to input audio signals or video signals. The A/V input device 120 may include a camera 121 and a microphone 122. The camera 121 may process image frames, such as still images or moving images, acquired by an image sensor in a video communication mode or in a shooting mode. The processed image frames may be displayed on the display device 151.

The image frames captured by the camera 121 may be processed by the controller 180, stored in the memory 160, or transmitted to an external device via the wireless communication device 110. According to circumstances, two or more cameras 121 may be provided.

The microphone 122 receives external acoustic signals and processes the received acoustic signals into electrical speech data in a communication mode or a recording mode and a speech recognition mode. In the communication mode, the processed speech data may be converted and output in a form transmittable to a mobile communication base station through the mobile communication module 112. Various noise removal algorithms to remove noise generated during input of external acoustic signals into the microphone 122 may be incorporated in the microphone 122.

The user input device 130 allows a user to input commands to control the operation of a terminal. The user input device 130 may include a key pad, a dome switch, a touch pad (static pressure/electrostatic), a jog wheel, a jog switch or another appropriate interface.

The sensing device 140 senses a current state of the three-dimensional image processing apparatus 100, such as an open and closed state of the three-dimensional image processing apparatus 100, a position of the three-dimensional image processing apparatus 100, whether user contact has been occurred, a direction of the three-dimensional image processing apparatus 100, acceleration/deceleration of the three-dimensional image processing apparatus 100 or the like to generate a sensing signal to control the operation of the three-dimensional image processing apparatus 100. For example, in a case in which the three-dimensional image processing apparatus 100 is a slide phone, the sensing device 140 may sense whether the slide phone has been opened or closed. Also, the sensing device 140 may sense whether power has been supplied from the power supply device 190 and whether the interface device 170 has been coupled to an external device. Meanwhile, the sensing device 140 may include a proximity sensor 141 and an ambient light sensor 143.

The output device 150 may generate output related to visual sensation, auditory sensation or tactile sensation. The output device 150 may include a display device 151, an acoustic output module 152, an alarm device 153, a haptic module 154, a projector module 155, or another appropriate type of output interface.

The display device 151 may display (output) information processed by the three-dimensional image processing apparatus 100. For example, when the three-dimensional image processing apparatus 100 is in a communication mode, the display device 151 may display a user interface (UI) or a graphical user interface (GUI) related to communication. When the three-dimensional image processing apparatus 100 is in a video communication mode or an image capture mode, the display device 151 may display captured and/or received images, a UI or a GUI. When the three-dimensional image processing apparatus 100 is in a broadcast signal display mode or an image display mode, the display device 151 may display broadcast signals or stored image data.

The display device 151 may include at least one display selected from among a liquid crystal display (LCD), a thin film transistor-liquid crystal display (TFT-LCD), an organic light emitting diode (OLED), a flexible display and a three-dimensional display (3D display), or another appropriate type of display.

Some of these displays may be configured into a transparent type or light transmission type displays, through which the outside can be seen. These displays may be referred to as transparent displays. A representative of the transparent displays is a transparent OLED (TOLED). The rear structure of the display device 151 may also be configured into a light transmission type structure. In this structure, it is possible for a user to view objects located at the rear of the terminal body through a region occupied by the display device 151 of the terminal body.

Depending upon how the three-dimensional image processing apparatus 100 is realized, two or more display devices 151 may be provided. For example, the three-dimensional image processing apparatus 100 may be configured so that a plurality of display devices is disposed on a single plane in a state in which the display devices are spaced apart from each other or are in one deviceed body or so that the display devices are disposed on different planes.

In a case in which the display device 151 and a sensor to sense a touch operation (hereinafter, referred to as a 'touch sensor') constitute a layered structure (hereinafter, referred to as a 'touch screen'), the display device 151 may be used as an input device as well as an output device. For example, the touch sensor may be configured in the form of a touch film, touch sheet, touch pad or the like.

The touch sensor may be configured to convert the change of pressure applied to a specific region of the display device 151 or the change of capacitance generated in a specific region of the display device 151 into an electric input signal. The touch sensor may be configured to sense touch pressure as well as a touched position and area.

When touch input has been performed with respect to the touch sensor, a corresponding signal(s) is transmitted to a touch controller. The touch controller processes the signal(s) and transmits data corresponding to the processed signal(s) to the controller 180. Consequently, the controller 180 can determine which region of the display device 151 has been touched.

The proximity sensor 141 may be disposed at an inner region of the three-dimensional image processing apparatus 100 and surrounded by the touch screen or in the vicinity of the touch screen. The proximity sensor may sense whether an object has approached a predetermined sensing surface or is present in the vicinity of the predetermined sensing surface using electromagnetic force or infrared rays without mechanical contact. The proximity sensor may have a longer lifespan and higher applicability than a contact type sensor.

Examples of the proximity sensor 141 may include a transmission type photoelectric sensor, direct reflection type photoelectric sensor, mirror reflection type photoelectric sensor, high frequency oscillation type proximity sensor, capacitive type proximity sensor, magnetic type proximity sensor, infrared proximity sensor, or the like. In a case in which the touch screen is of an electrostatic type, the touch screen is configured to sense an approach of a pointer based on change in an electric field caused by the approach of the pointer. In this case, the touch screen (touch sensor) may be classified as a proximity sensor.

In the following description, an action in which a pointer approaches the touch screen without contact and it is recognized that the pointer is located on the touch screen is referred to as "proximity touch" and an action in which a pointer directly contacts the touch screen is referred to as "contact touch" for convenience of description. A position at which proximity touch of the pointer is performed on the touch screen is a position at which the pointer corresponds substantially perpendicular to the touch screen when the proximity touch of the pointer is performed.

The proximity sensor 141 senses a proximity touch operation and proximity touch patterns (for example, a proximity touch distance, a proximity touch direction, proximity touch velocity, proximity touch time, a proximity touch position, proximity touch movement, etc.). Information corresponding to the sensed proximity touch operation and proximity touch patterns may be output on the touch screen.

The acoustic output module 152 may output audio data received from the wireless communication device 110 or stored in the memory 160 in a call signal reception mode, a communication mode, a recording mode, a speech recognition mode, a broadcast reception mode, or the like. The acoustic output module 152 may output acoustic signals related to functions (for example, call signal reception sound, message reception sound, etc.) executed by the three-dimensional image processing apparatus 100. The acoustic output module 152 may include a receiver, speaker, buzzer, or another appropriate acoustic device.

The alarm device 153 may output signals to notify that events have been generated in the three-dimensional image processing apparatus 100. Examples of events generated in the three-dimensional image processing apparatus 100 may include call signal reception, message reception, key signal input, touch input, or the like. The alarm device 153 may output other different signals, for example vibration signals to notify of event generation in addition to video signals and audio signals. The video signals and audio signals may also be output through the display device 151 or the speech output module 152. Consequently, the display device 151 or the speech output module 152 may be classified as a part of the alarm device 153.

The haptic module 154 may generate various tactile effects that a user can feel. A representative example of the tactile effects generated by the haptic module 154 is vibration. It is possible to control intensity and patterns of vibration generated by the haptic module 154. For example, different kinds of vibration may be output in a synthesized state or may be sequentially output.

In addition to vibration, the haptic module 154 may generate various tactile effects, such as stimulative effects caused by the arrangement of pins movable perpendicularly to the skin with which the pins are in contact, injection force or suction force of air through an injection port or a suction port, rubbing against the skin, contact with an electrode, electrostatic force, etc. and effects through reproduction of cold and warm sensation using endothermic or exothermic elements.

The haptic module 154 may be configured to transmit tactile effects through direct contact and, in addition, for a user to feel tactile effects through sensation of muscles, such as fingers or arms. Depending upon how the three-dimensional image processing apparatus 100 is configured, two or more haptic modules 154 may be provided.

The projector module 155 is a component to perform an image projection function using the three-dimensional image processing apparatus 100. The projector module 155 may display an image identical to or partially different from the image displayed on the display device 151 on an external screen or wall according to a control signal of the controller 180.

Specifically, the projector module 155 may include a light source to generate light (for example, laser light) necessary to output an image to the outside, an image generation device to generate an image to be output to the outside using the light generated by the light source, and a lens to output the image from a predetermined focal distance to the outside in an enlarged state. Also, the projector module 155 may include a device to mechanically move the lens of the entirety of the module to control an image projection direction.

Depending upon kinds of display devices, the projector module 155 may be classified as a cathode ray tube (CRT) module, a liquid crystal display (LCD) module, a digital light processing (DLP) module, or the like. In particular, the DLP module is configured so that light generated from the light source is reflected by digital micromirror device (DMD) chips to project the generated image in an enlarged state. Consequently, the DLP module may be advantageous in reducing the size of the projector module 151.

The projector module 155 may be provided at the side, front or rear of the three-dimensional image processing apparatus 100 in the longitudinal direction thereof. Of course, the projector module 155 may be provided at any position of the three-dimensional image processing apparatus 100 as needed.

The memory 160 may store programs necessary for the controller 180 to perform processing and control and, in addition, temporarily store input/output data (for example, telephone directories, messages, audio, still images, moving images, etc.) The memory 160 may also store frequency of use of the data (for example, frequency of use of each telephone number, each message and each piece of multimedia). Also, the memory 160 may store data related to various patterns of vibration and sound output upon performing touch input on the touch screen.

The memory 160 may include at least one selected from among a flash memory type memory, a hard disk type memory, a multimedia card micro type memory, a card type memory (for example, SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, or another appropriate type of storage device. The three-dimensional image processing apparatus 100 may be operated in connection with a web storage, which performs a storage function of the memory 160 over the Internet.

The interface device 170 serves as a path to external devices connected to the three-dimensional image processing apparatus 100. Through the interface device 170, data from the external devices may be received by the three-dimensional image processing apparatus 100, power supplied to the components of the three-dimensional image processing apparatus 100, or data transmitted from the three-dimensional image processing apparatus 100 to the external devices. For example, a wired/wireless headset port, an external charger port, a wired/wireless data port, a memory card port, a port to connect a device having an identification module, an audio input/output (I/O) port, a video I/O port, an earphone port, etc. may be included in the interface device 170.

The identification module is a chip which stores various kinds of information necessary to authenticate a user of the three-dimensional image processing apparatus 100. The identification module may include a user identity module (UIM), a subscriber identity module (SIM) and a universal scriber identity module (USIM). A device having such an identification module (hereinafter, referred to as an 'identification device') may be manufactured in the form of a smart card. Consequently, the identification device can be connected to the three-dimensional image processing apparatus 100 through the port.

The interface device 170 may be a path through which power from an external cradle is supplied to the three-dimensional image processing apparatus 100 when the three-dimensional image processing apparatus 100 is connected to the cradle or a path through which various command signals input by a user through the cradle are transmitted to the mobile terminal. Various command signals or power input from the cradle may be operated as a signal to recognize that the mobile terminal has been correctly mounted in the cradle.

The controller 180 may control overall operations of the three-dimensional image processing apparatus 100. For example, the controller 180 may perform control and processing related to speech communication, data communication, video communication, etc. The controller 180 may include a multimedia module 181 to reproduce multimedia. The multimedia module 181 may be incorporated in the controller 180 or may be configured separately from the controller 180.

The controller 180 may perform pattern recognition processing to recognize handwriting input or drawing input performed on the touch screen as text and images. Also, the controller 180 may detect user action and control a command or operation corresponding to the detected user action to be performed. The user action may include selection of a physical button of the three-dimensional image processing apparatus 100 or a remote control, execution of a predetermined gesture on the touch screen or selection of a soft button on the touch screen, execution of a predetermined gesture recognized from images captured by the camera 121, execution of a predetermined speech recognized by speech recognition, or the like.

The controller 180 may receive image frames in which a user image has been captured from the camera 121 and detect a position of the user using the received image frames. In some embodiments, the controller 180 may calculate a position of a three-dimensional image filter based on the detected position of the user. Here, the position of the three-dimensional image filter may be a position of a barrier or a position of the lens.

Figure 11:
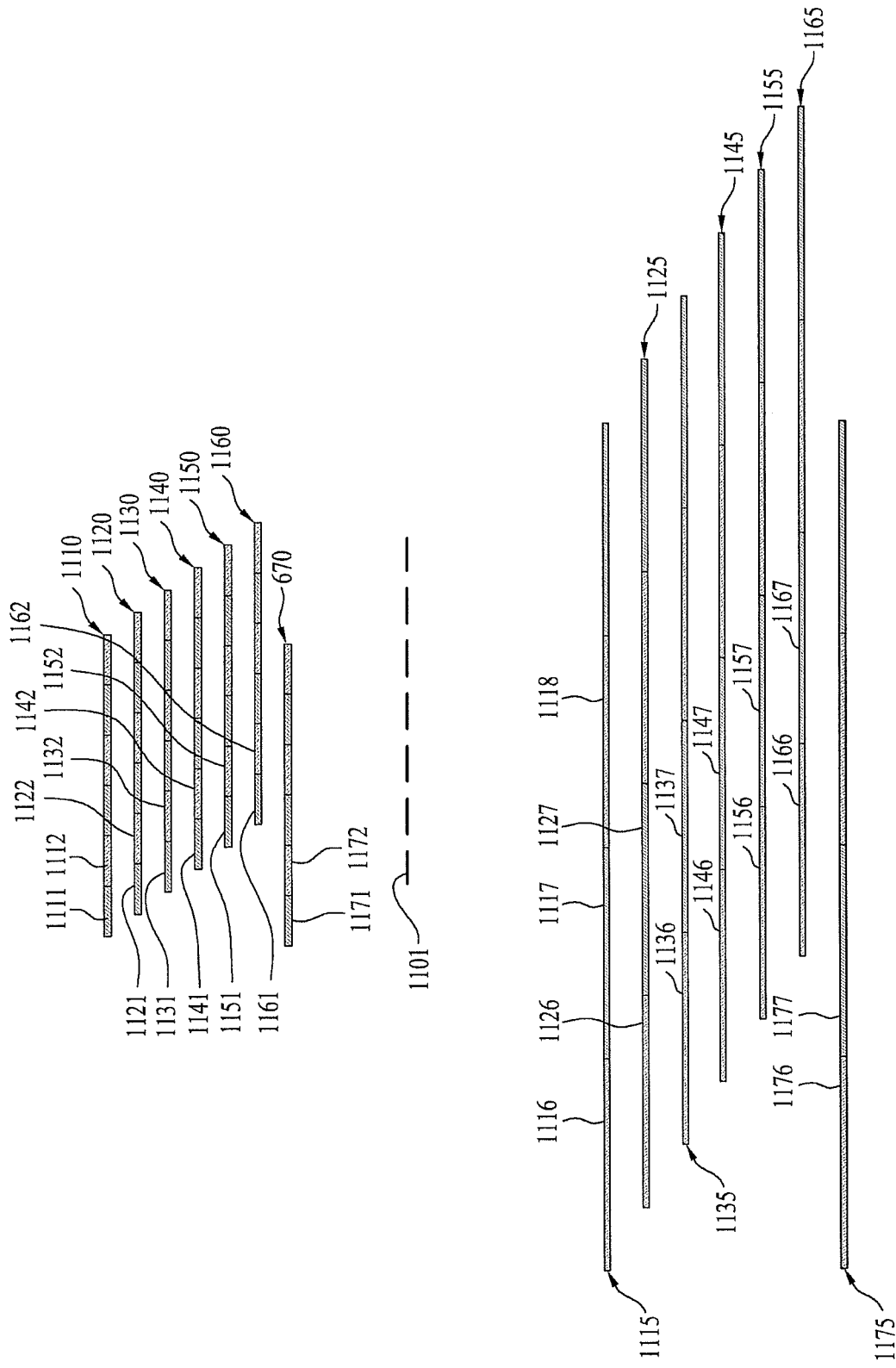
FIG. 11 is a diagram illustrating a movement of a sweet spot according to a change in display position of a view image.

In some embodiments, the controller 180 may calculate variation of three-dimensional images based on the detected position of the user. Also, the controller 180 may set a position where a view image contained in the three-dimensional images will be displayed based on the calculated variation of three-dimensional images. For example, as shown in FIG. 11, the controller 180 may control display positions of a left view image and a right view image depending upon the detected position of the user.

Also, the controller 180 may calculate a difference value between the calculated position of the three-dimensional image filter and the current position of the three-dimensional image filter to calculate an amount of movement of the three-dimensional image filter. Here, the amount of movement of the three-dimensional image filter may be an amount of movement of the barrier or an amount of movement of the lens.

The controller 180 may calculate velocity of movement of the user using at least one selected from among the current detected position of the user and the previously detected position of the user. Also, the controller 180 may estimate a position of the user when a predetermined time elapses using the detected position of the user and the calculated velocity of movement of the user and calculate a position of the three-dimensional image filter and an amount of movement of the three-dimensional image filter based on the estimated position of the user.

The controller 180 may generate a control signal requesting movement of the three-dimensional image filter based on the calculated position of the three-dimensional image filter or the calculated amount of movement of the three-dimensional image filter and may output the generated control signal to the three-dimensional image filter drive device 183.

The three-dimensional image filter drive device 183 may control movement of the barrier or the lens of the three-dimensional image filter 185 based on the position of the three-dimensional image filter calculated by the controller 180. The three-dimensional image filter drive device 183 may calculate a difference value between the position of the three-dimensional image filter calculated by the controller 180 and the current position of the three-dimensional image filter to calculate an amount of movement of the three-dimensional image filter, and may control movement of the barrier or the lens based on the calculated amount of movement of the three-dimensional image filter.

In some embodiments, the three-dimensional image filter drive device 183 may control movement of a transmission region and a non-transmission region of the three-dimensional image filter 185 based on a position of the non-transmission region calculated by the controller 180. In some embodiments, the three-dimensional image filter drive device 183 may control movement of the lens of the three-dimensional image filter 185 based on the position of the lens calculated by the controller 180. Here, the transmission region is a region of the three-dimensional image filter through which light is transmitted, and the non-transmission region is a region of the three-dimensional image filter through which light is not transmitted. Also, the non-transmission region may be a region occupied by the barrier.

The three-dimensional image filter 185 is a filter to enable a user to view two or more view images displayed on the display device 151 as three-dimensional images. That is, the three-dimensional image filter 185 controls optical paths of view images displayed by the display device 151. Controlling optical paths of view images may mean interrupting optical paths of some of the view images or refracting the view images. Here, the three-dimensional image filter 185 may be a liquid crystal parallax barrier or a liquid crystal lenticular filter.

In some embodiments, the three-dimensional image filter 185 may include transmission regions and non-transmission regions arranged at predetermined intervals. Light emitted from the display device 151 passes through the transmission regions and reaches the right eye or the left eye of a user. In a case in which the three-dimensional image filter 185 is the liquid crystal parallax barrier, the non-transmission regions may be constituted by barriers. A pair of transmission and non-transmission regions may be referred to as a pitch. The transmission regions and the non-transmission regions of the three-dimensional image filter 185 may be moved under control of the three-dimensional image filter drive device 183. At this time, the three-dimensional image filter 185 may be fixed to the three-dimensional image processing apparatus 100.

In some embodiments, in a case in which the three-dimensional image filter 185 is the liquid crystal lenticular filter, the transmission regions and the non-transmission regions may be divided from each other by lenses. One lens may be referred to as a pitch. The lenses of the three-dimensional image filter 185 may be moved under control of the three-dimensional image filter drive device 183. At this time, the three-dimensional image filter 185 may be fixed to the three-dimensional image processing apparatus 100.

The power supply device 190 supplies external power or internal power to the respective components of the three-dimensional image processing apparatus under control of the controller 180.

The ambient light sensor 143 may sense the illuminance of ambient light outside the three-dimensional image processing apparatus 100 and output the sensed illuminance of the ambient light to the controller 180. The three-dimensional image processing apparatus 100 may further include an analog/digital (A/D) converter to convert the illuminance of the ambient light sensed by the ambient light sensor 143 into a digital value and to output the converted digital value to the controller 180.

The controller 180 may adjust a mode of a tracking function based on the illuminance of the ambient light sensed by the ambient light sensor 143. The tracking function is a function to set user position information related to the position of a user using images captured by the camera 121 and to generate a control signal to control a perceived display of three-dimensional images based on the set user position information. Here, the control signal may include at least one selected from among a control signal to control movement of the lens of the lenticular lens board, a control signal to control movement of the non-transmission region of the parallax barrier, and a control signal to control positions of view images to be displayed on the display device 151. Also, a mode of the tracking function may include at least one selected from among an off mode in which the tracking function is not executed and an on mode in which the tracking function is executed. The on mode may include at least one selected from among a stop mode in which the execution of the tracking function is stopped, a limit mode in which the tracking function is limitedly executed, and a normal mode in which the tracking function is normally executed.

Various embodiments described herein may be realized in recording media, which can be read from a computer or a device similar thereto, for example, using software, hardware or a combination thereof.

In a hardware type realization, embodiments described herein may be realized using at least one selected from among application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or another appropriate type of device. Embodiments described herein may be realized using the controller 180.

In a software type realization, embodiments such as procedures and functions described herein may be realized using additional software modules. The software modules may perform one or more functions and operations described herein. Software code may be realized using a software application written using an appropriate programming language. The software code may be stored in the memory 160 and may be executed by the controller 180.

Figure 2:
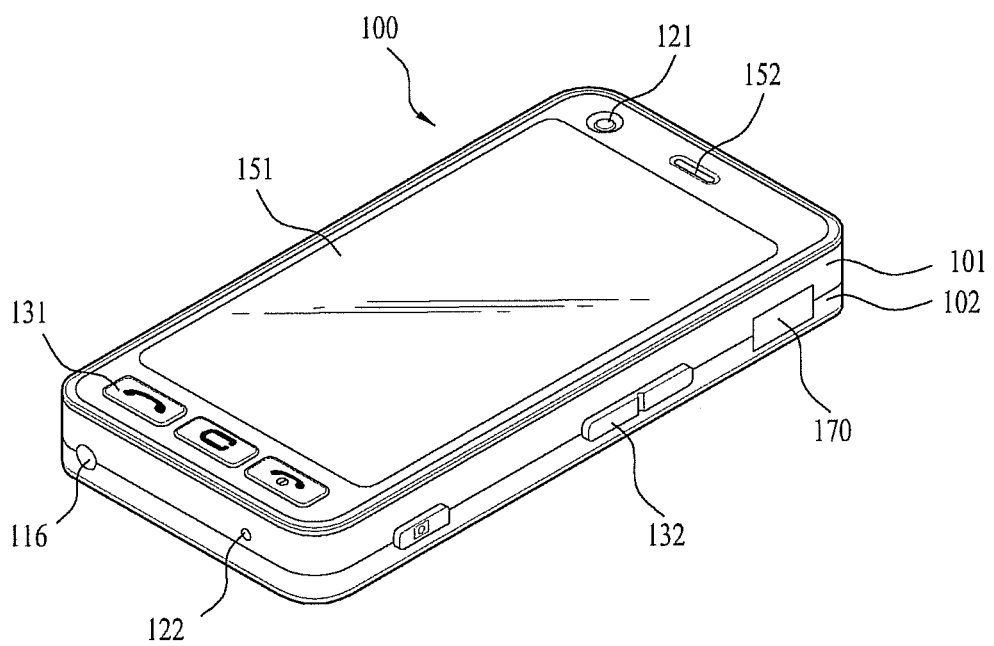
FIG. 2 is a front perspective view of a three-dimensional image processing apparatus according to an embodiment of the present disclosure.

FIG. 2 is a front perspective view of a three-dimensional image processing apparatus according to an embodiment of the present disclosure. The three-dimensional image processing apparatus 100 is shown to have a bar type terminal body. However, embodiments of the present disclosure are not limited thereto. Embodiments of the present disclosure may be applied to various structures, such as a slide type structure, a folder type structure, a swing type structure, a swivel type structure, or the like, in which two or more bodies are coupled to each other so that the bodies can move relative to each other.

The body includes a case (casing, housing, cover, etc.) forming the external appearance thereof. In this embodiment, the case may be divided into a front case 101 and a rear case 102. Various electronic parts are mounted in a space defined between the front case 101 and the rear case 102. At least one intermediate case may be further provided between the front case 101 and the rear case 102. The cases may be formed through injection molding of a synthetic resin or may be formed of a metal material, such as stainless steel (STS) or titanium (Ti).

The display device 151, the acoustic output device 152, the camera 121, the user input device 130 (131 and 132), the microphone 122, and the interface device 170 may be disposed at the terminal body, particularly at the front case 101. The display device 151 may occupy a major portion of the main surface of the front case 101. The acoustic output device 152 and the camera 121 may be disposed at a region of the front case 101 adjacent to one end of the display device 151. The three-dimensional image filter 185 may be disposed at one end of the display device 151. The three-dimensional image filter 185 may be bonded to one end of the display device 151. The user input device 131 and the microphone 122 may be disposed at a region of the front case 101 adjacent to the other end of the display device 151. The user input device 131 and the interface device 170 may be disposed at sides of the front case 101 and the rear case 102.

The user input device 130 may allow a user to input a command to control the operation of the three-dimensional image processing apparatus 100. The user input device 130 may include a plurality of manipulation devices 131 and 132. The manipulation devices 131 and 132 may be generally referred to as a manipulation portion. Any type of manipulation devices 131 and 132 may be adopted as long as a user can manipulate the manipulation devices 131 and 132 while having a tactile sensation.

Content input via the first or second manipulation device 131 or 132 may be variously set. For example, the first manipulation device 131 may allow a user to input commands such as start, end and scroll, and the second manipulation device 132 may allow a user to input commands to adjust the volume of sound output from the acoustic output device 152 or switch to a touch recognition mode of the display device 151.

Figure 3:
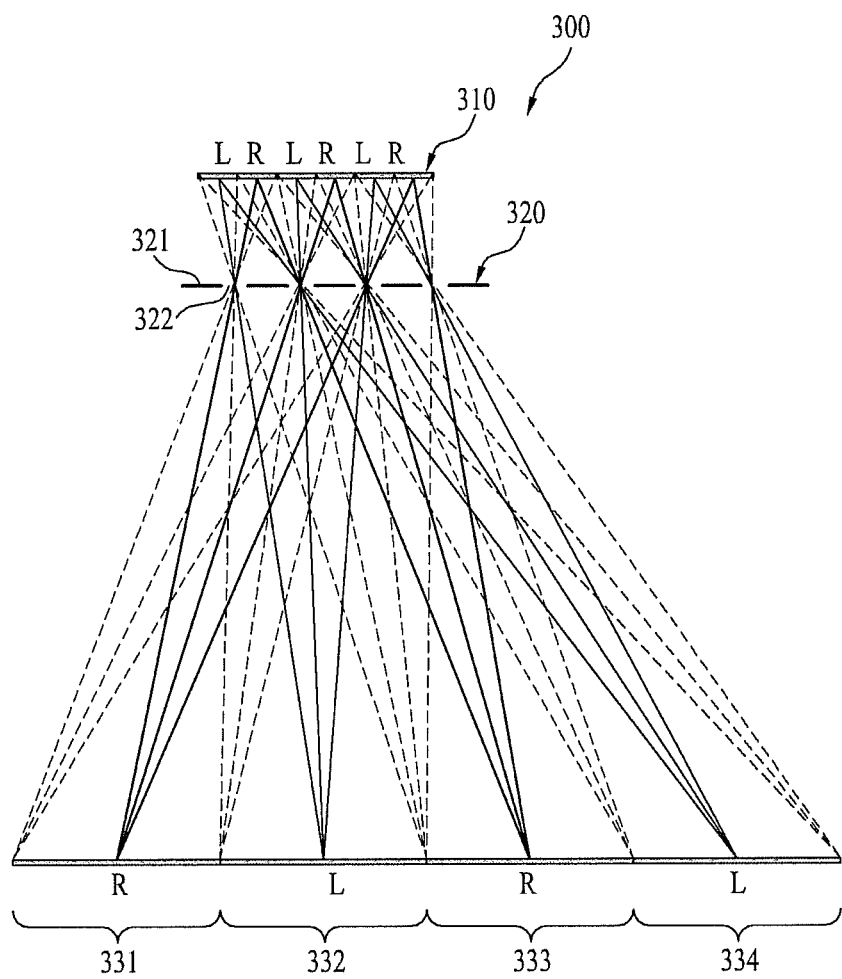
FIG. 3 is a diagram showing the disposition of a three-dimensional image filter according to an embodiment of the present disclosure.

FIG. 3 is a diagram showing the disposition of a three-dimensional image filter according to an embodiment of the present disclosure. A three-dimensional image panel 300 may include a display panel 310 to display a three-dimensional image constituted by a mixture of left view images L and right view images R and a three-dimensional image filter 320 having non-transmission regions 321 and transmission regions 322 which are arranged at predetermined intervals. Here, the three-dimensional image filter 320 may be a liquid crystal parallax barrier. Meanwhile, the display device 151 of FIG. 1 may be the display panel 310, and the three-dimensional image filter 185 of FIG. 1 may be the three-dimensional image filter 320.

The three-dimensional image filter 320 may be disposed in front of the display panel 310 so that the three-dimensional image filter 320 is spaced from the display panel 310 by a predetermined distance. The non-transmission regions 321 and the transmission regions 322 may be alternately arranged in the direction parallel to the display panel 310.

The display panel 310 displays view images corresponding to the left eye L and the right eye R, and the displayed left view images L and right view images R may be viewed through the three-dimensional image filter 320. The left eye and the right eye of the user may independently view the corresponding left view images L and the right view images R provided on the display panel 310. As a result, the user may experience a three-dimensional effect.

A spot where the user can view the three-dimensional image well is called a sweet spot. That is, the sweet spot may be a spot where left view images L and right view images R do not overlap, e.g., cross-talk does not occur, and left view images L and right view images R are not flipped, e.g., image flipping does not occur. The sweet spot where the left view images L are seen well may be points 332 and 334, and the sweet spot where the right view images R are seen well may be points 331 and 333. In a case in which the right eye of the user is located at the points 332 or 334 and the left eye of the user is located at the points 331 or 333, image flipping may occur (e.g., the perceived 3D effect such as the perceived depth may be inverted).

Figure 4:
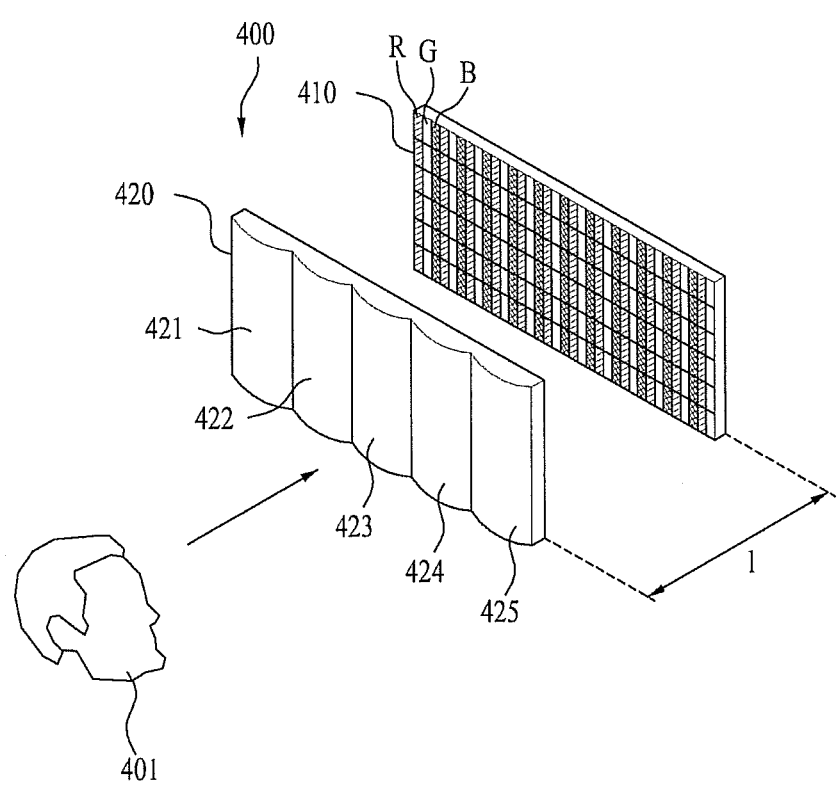
FIG. 4 is a perspective view showing the disposition of a three-dimensional image filter according to an embodiment of the present disclosure.

FIG. 4 is a perspective view showing the disposition of a three-dimensional image filter according to another embodiment of the present disclosure. A three-dimensional image panel 400 may include a display panel 410 to display a three-dimensional image constituted by a mixture of left view images L and right view images R and a three-dimensional image filter 420 having a plurality of lenses. The display device 151 of FIG. 1 may be the display panel 410, and the three-dimensional image filter 185 of FIG. 1 may be the three-dimensional image filter 420.

The three-dimensional image filter 420 may be disposed in front of the display panel 410. In this case, the three-dimensional image filter 420 may be spaced from the display panel 410 by a predetermined distance I so that images are placed on focal planes of the lenses. The three-dimensional image filter 420 may be a lenticular filter. In this case, the lens 421, the lens 422, the lens 423, the lens 424 and the lens 425 of the three-dimensional image filter 420 may be liquid crystal lenses.

Figure 5:
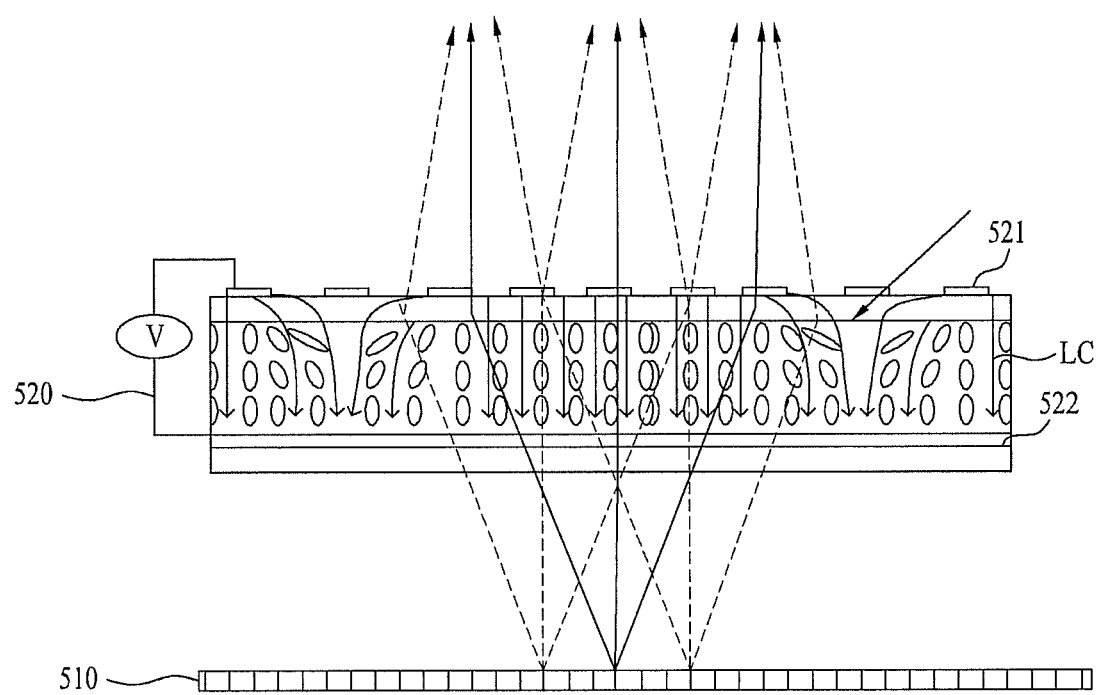
FIG. 5 is a diagram illustrating a principle of a liquid crystal lenticular filter.

FIG. 5 is a diagram illustrating a principle of a liquid crystal lenticular filter. A liquid crystal lenticular filter 520 may include transparent electrodes (ITO) 521 and 522 and a liquid crystal LC disposed between the transparent electrodes. The liquid crystal lenticular filter 520 may adjust refraction of light emitted from the display panel 510 through the liquid crystal LC so that view images are placed at appropriate sweet spots. That is, the liquid crystal LC constitutes lenses to refract light. The liquid crystal lenticular filter 520 may adjust voltage applied to the transparent electrodes (ITO) to adjust the position, direction and disposition of the liquid crystal LC. Depending upon the position, direction and disposition of the liquid crystal LC, the positions of the lenses may be changed, and therefore, the sweet spots may be changed.

FIGS. 6A to 6D are block diagrams that illustrate operational modes (states) of a controller according to an embodiment of the present disclosure. The controller 180 may include a position detection device 610, a movement amount calculation device 620, and a communication controller 630.

The position detection device 610 may receive image frames in which a user image has been captured from the camera 121 and detects a position of the user using the received image frames. The position detection device 610 may recognize a face region to detect the position of the user. Here, the position detection device 610 may recognize the face region using an algorithm based on symmetry of a face, an algorithm based on hair color and face color, and an algorithm based on the contour of a face. Also, the position detection device 610 may calculate skin color information from the image frames to recognize the facial region.

The movement amount calculation device 620 may calculate a position of the three-dimensional image filter and a movement amount of the three-dimensional image filter based on the detected position of the user and outputs the calculated position of the three-dimensional image filter or the calculated movement amount of the three-dimensional image filter. Also, the movement amount calculation device 620 may generate a control signal to control movement of the non-transmission regions of the three-dimensional image filter according to the current position of the three-dimensional image filter and the calculated movement amount of the three-dimensional image filter, and may output the generated control signal to the communication controller 630. The generated control signal may be a signal to enable the non-transmission regions of the three-dimensional image filter to be located at a point away from the current point by the calculated movement amount of the three-dimensional image filter.

In some embodiments, the movement amount calculation device 620 may find the positions of the transmission regions and the non-transmission regions of the three-dimensional image filter having sweet spots corresponding to the detected position of the user and may calculate differences between the found positions and the current positions of the transmission regions and the non-transmission regions of the three-dimensional image filter to obtain a movement amount of the three-dimensional image filter.

In some embodiments, the movement amount calculation device 620 may calculate the position of the lens and the movement amount of the lens based on the detected position of the user and may output the calculated position of the lens and the calculated movement amount of the lens. The calculated position of the lens and the calculated movement amount of the lens may be output to the three-dimensional image filter drive device 183.

The movement amount calculation device 620 may generate a control signal to control movement of the lens according to the current position of the lens and the calculated movement amount of the lens and may output the generated control signal to the communication controller 630. The generated control signal may be a signal to enable the lens to be located at a point away from the current point by the calculated movement amount of the lens.

The communication controller 630 may transmit the control signal generated by the movement amount calculation device 620 to the three-dimensional image filter drive device 183. The communication controller 630 may output the control signal to the three-dimensional image filter drive device 183 in an I2C communication fashion.

Figure 6A:
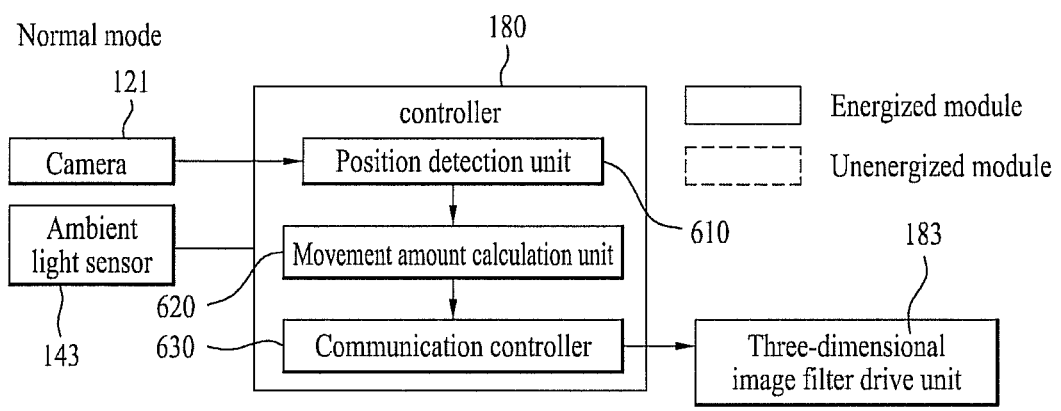
FIGS. 6A to 6D are block diagrams that illustrate operational modes of a controller according to an embodiment of the present disclosure.

Referring to FIG. 6A, in a case in which the mode of the tracking function is a normal mode, power is supplied to the camera 121, the ambient light sensor 143, the position detection device 610, the movement amount calculation device 620, and the communication controller 630.

Figure 6B:
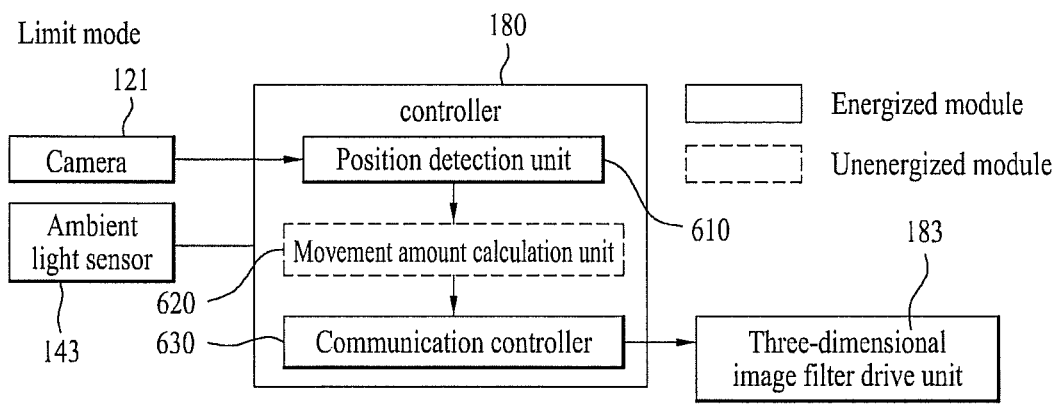

Referring to FIG. 6B, in a case in which the mode of the tracking function is a limit mode, power is supplied to the camera 121, the ambient light sensor 143, the position detection device 610, and the communication controller 630. However, power is not supplied to the movement amount calculation device 620.

Figure 6C:
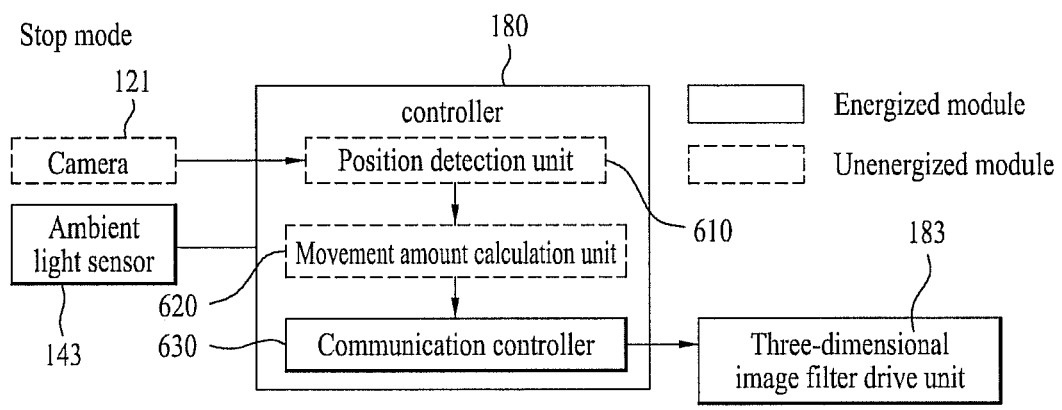

Referring to FIG. 6C, in a case in which the mode of the tracking function is a stop mode, power is supplied to the ambient light sensor 143 and the communication controller 630. However, power is not supplied to the camera 121, the position detection device 610, and the movement amount calculation device 620.

Figure 6D:
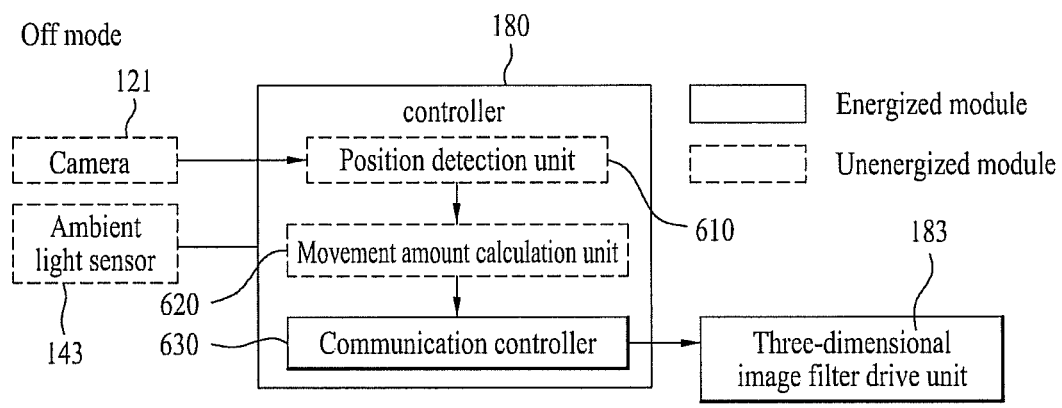

Referring to FIG. 6D, in a case in which the mode of the tracking function is an off mode, power is supplied to the communication controller 630. However, power is not supplied to the camera 121, the ambient light sensor 143, the position detection device 610, and the movement amount calculation device 620.

In some embodiments, in a case in which the mode of the tracking function is not a normal mode, power may not be supplied to the communication controller 630.

That power is not supplied to the position detection device 610, the movement amount calculation device 620, and the communication controller 630 may mean that the position detection device 610, the movement amount calculation device 620, and the communication controller 630 are not operated and associated load of the controlling 180 is reduced.

Figure 7:
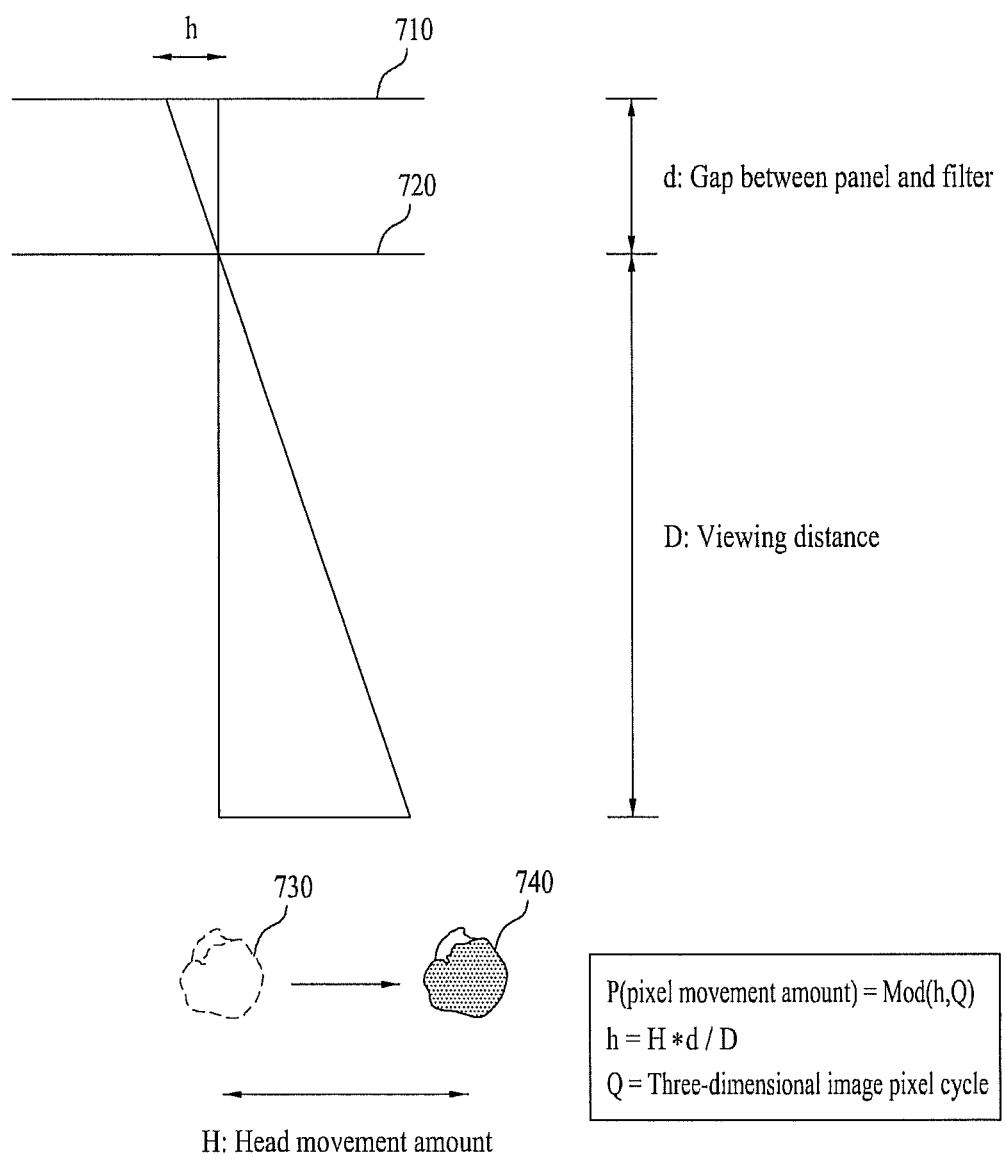
FIG. 7 is a diagram illustrating calculation of a three-dimensional image variation depending upon change in position of a user.

FIG. 7 is a diagram illustrating a process for calculating a three-dimensional image variation depending upon change in position of a user. When a user moves from a position 730 to a position 740, a corresponding movement amount or distance h on a display panel 710 may be calculated using mathematical expression 1 below:

$$h=H*d/D \qquad (1)$$

where H indicates a head movement amount of a user, D indicates a distance from a three-dimensional image filter 720 to the eyes of a user, e.g., a viewing distance, and d indicates a gap between the display panel 710 and the three-dimensional image filter 720.

When the user moves from the position 730 to the position 740, an example of the variation of the three-dimensional image, e.g., a pixel movement amount P, may be calculated using mathematical expression 2 below:

$$P=\text{Mod}(h,Q) \quad (2)$$

where Q indicates a three-dimensional image pixel cycle.

The movement amount calculation device 620 may calculate variation of the three-dimensional image using mathematical expression 1 and mathematical expression 2 and may calculate a movement amount of the three-dimensional image filter based on the calculated variation of the three-dimensional image.

Figure 8:
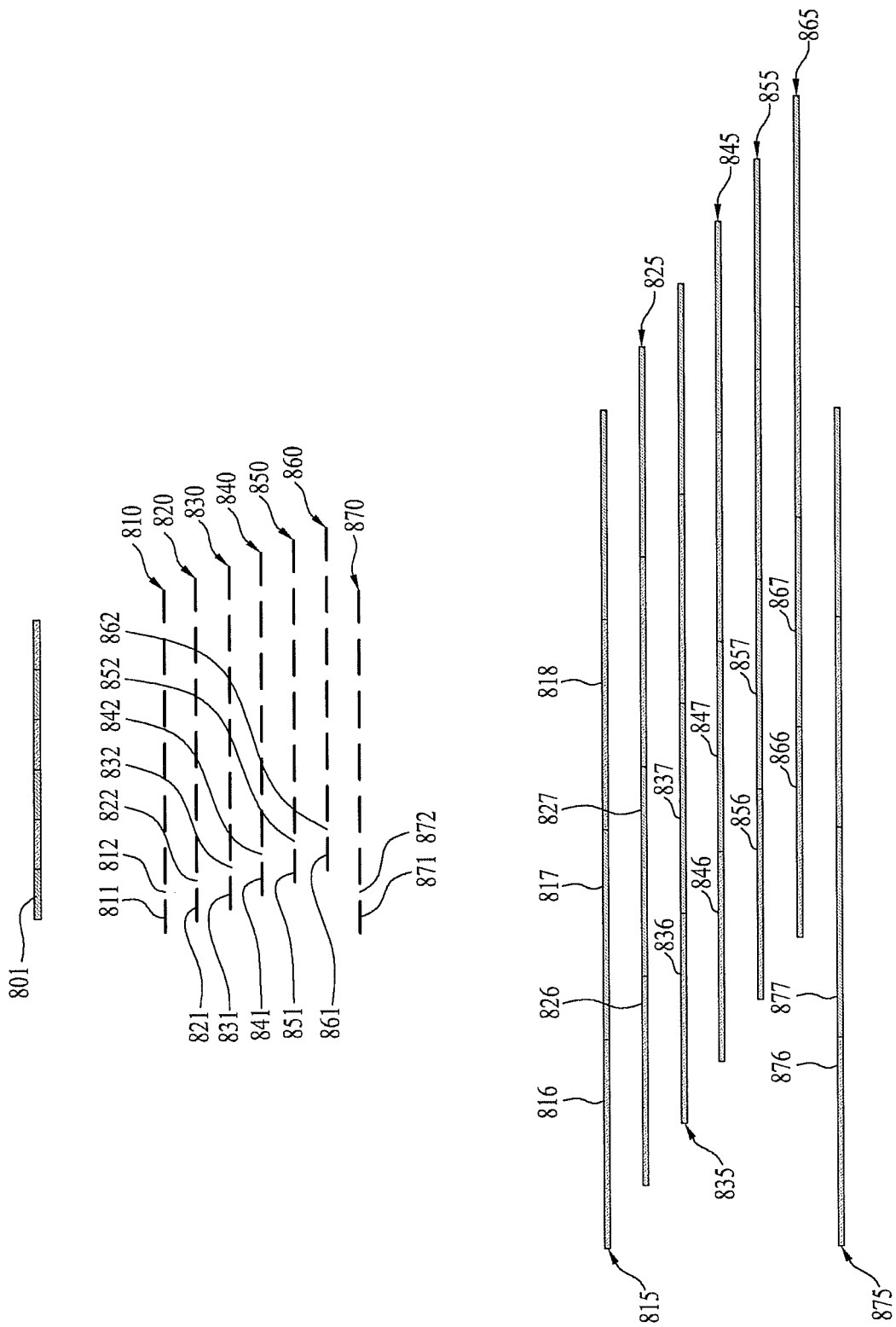
FIG. 8 is a diagram illustrating a movement of a sweet spot according to a change in position of a three-dimensional image filter.

FIG. 8 is a diagram illustrating a movement of a sweet spot according to a change in position of a three-dimensional image filter. A three-dimensional image filter 810 including non-transmission regions 811 and transmission regions 812 has a sweet spot 815 in which sweet spots 817 to enable a user to view left view images L displayed on a display panel 801 and sweet spots 816 to enable the user to view right view images R displayed on the display panel 801 are alternately arranged.

A three-dimensional image filter 820 including non-transmission regions 821 and transmission regions 822 may have a sweet spot 825 that correspond to the position of the user. The sweet spot 825 may include a sweet spot 827 corresponding to left view images L displayed on the display panel 801 and sweet spot 826 corresponding to right view images R displayed on the display panel 801 the left eye sweet spots 827 and right eye sweet spots 826 may be alternately arranged.

A three-dimensional image filter 830 including non-transmission regions 831 and transmission regions 832 may have a corresponding sweet spot 835, in which sweet spots 837 that enable a user to view left view images L displayed on the display panel 801 and sweet spots 836 that enable the user to view right view images R displayed on the display panel 801 are alternately arranged.

A three-dimensional image filter 840 including non-transmission regions 841 and transmission regions 842 may correspond to a sweet spot 845, in which sweet spots 847 that enable a user to view left view images L displayed on the display panel 801 and sweet spots 846 that enable the user to view right view images R displayed on the display panel 801 are alternately arranged.

A three-dimensional image filter 850 including non-transmission regions 851 and transmission regions 852 may correspond to a sweet spot 855, in which sweet spots 857 that enable a user to view left view images L displayed on the display panel 801 and sweet spots 856 that enable the user to view right view images R displayed on the display panel 801 are alternately arranged.

A three-dimensional image filter 860 including non-transmission regions 861 and transmission regions 862 may have a sweet spot 865, in which sweet spots 867 that enable a user to view left view images L displayed on the display panel 801 and sweet spots 866 that enable the user to view right view images R displayed on the display panel 801 are alternately arranged.

A three-dimensional image filter 870 including non-transmission regions 871 and transmission regions 872 may have a sweet spot 875, in which sweet spots 877 that enable a user to view left view images L displayed on the display panel 801 and sweet spots 876 that enable the user to view right view images R displayed on the display panel 801 are alternately arranged.

The movement amount calculation device 620 may decide that the barrier or the lens of the three-dimensional image filter 185 should be arranged according to one of the arrangement patterns of the three-dimensional image filters 810 to 860 so as to move the sweet spot based on the point where the user is located. For example, in a case in which the left eye of the user is located at the point 817 and the right eye of the user is located at the point 818, the movement amount calculation device 620 decides that the barrier be arranged according to the arrangement pattern of the three-dimensional image filter 810 so that the sweet spot 815 is provided. In a case in which the left eye of the user moves from the point 817 to the point 837, the controller 180 may calculate a control signal to change the arrangement of the barrier from the arrangement pattern of the three-dimensional image filter 810 to the arrangement pattern of the three-dimensional image filter 830 so that the sweet spot 835 is provided and may output the calculated control signal to the communication controller 630.

Figure 9:
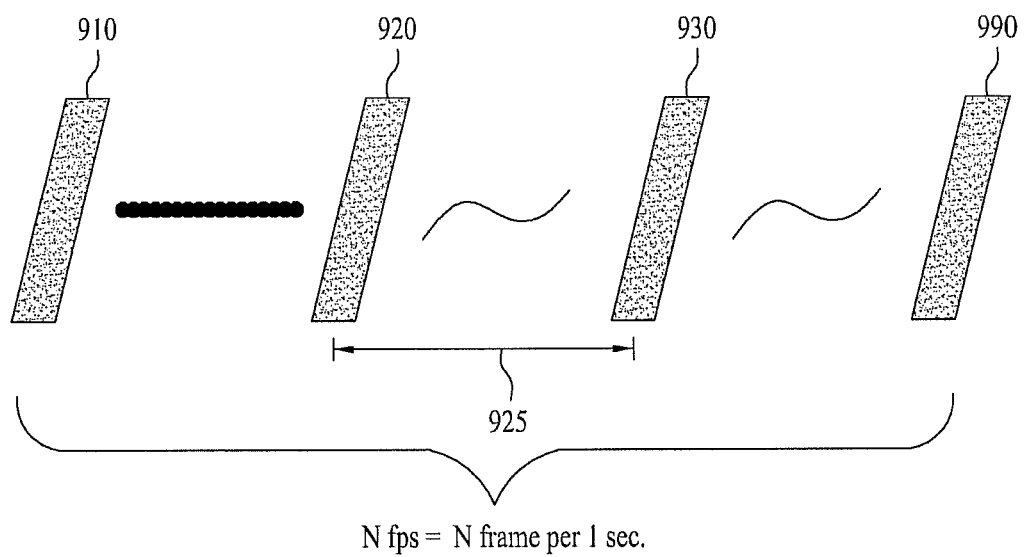
FIG. 9 is a diagram illustrating time intervals of image frames captured by a camera.

FIG. 9 is a diagram illustrating time intervals of image frames captured by the camera. The camera 121 may be driven at a fixed frame rate irrespective of the illuminance of ambient light or may be driven at more than a predetermined frame rate. The controller 180 may control the camera 121 to be driven at the fixed frame rate irrespective of the illuminance of ambient light or may control the camera 121 to be driven at more than the predetermined frame rate.

When the frame rate of the camera is N frames per second (fps), the camera 121 may capture N image frames 910 to 990 per second. A time interval 925 may be provided between the respective image frames.

Probabilities that the position of a user will be changed are the same on all time axes between the image frames 910 to 990. Consequently, delay time $T_C$ due to the camera 121 may be defined as represented by mathematical expression 3 below:

$$T_C < 1/FR \quad (3)$$

where FR indicates a frame rate of the camera 121. The delay $T_C$ may be designated as camera capture delay.

The maximum value $T_m$ of delay taken until the three-dimensional image filter is controlled according to the change in position of the user after the position of the user is changed may be defined as represented by mathematical expression 4 below:

$$T_m < 1/FR + T_t \quad (4)$$

where $T_t$ is a delay taken until the controller 180 receives the image frames in which the change in position of the user has been captured, generates a control signal using the received image frames, and the generated control signal is input to the three-dimensional image filter drive device 183.

In the present disclosure, the camera 121 may be driven below an amount of delay in which the three-dimensional image filter may be moved before the user exits the sweet spot and at least at a minimum frame rate at which the maximum value $T_m$ of delay is maintained. Also, the controller 180 may control the camera 121 to be driven at frame rate greater than or equal to the minimum frame rate.

A conventional camera is driven in a fashion to adjust exposure according to external brightness so as to provide a bright and vivid image when a user views a screen. However, the camera and the three-dimensional image processing apparatus according to the present disclosure may be configured to maintain the frame rate of the camera irrespective of external brightness. Even during movement of a user, therefore, it is possible for the user to always view a vivid three-dimensional image without experiencing crosstalk and image flipping.

The time interval 925 between the image frames of the camera 121 may be set to be greater than time delay $T_t$ taken until a control signal is generated using image frames captured by the camera 121, and the generated control signal is input to the three-dimensional image filter 185. That is, the time interval 925 may be set according to mathematical expression 5 below:

$$1/FR > T_t \tag{5}$$

The camera 121 may be driven at a frame rate satisfying mathematical expression 5, and the controller 180 may control the camera 121 to be driven at a frame rate satisfying mathematical expression 5. Also, the camera 121 may be driven at a fixed frame rate satisfying mathematical expression 5 irrespective of change in illuminance of ambient light, and the controller 180 may control the camera 121 to be driven at a fixed frame rate satisfying mathematical expression 5.

In some embodiments, time delay $T_t$ may be defined as represented by mathematical expression 6 below:

$$T_t = \alpha + \beta + \gamma + \delta \tag{6}$$

where, $\alpha$ indicates a delay taken until image frames captured by the camera 121 are input to the controller 180, $\beta$ indicates a delay taken until a control signal is generated using image frames input from the position detection device 610 and the movement amount calculation device 620, $\gamma$ indicates a delay taken until the communication controller 630 starts to transmit the generated control signal to the three-dimensional image filter drive device 183, and $\delta$ indicates a delay taken until the generated control signal passes from the communication controller 630 to the three-dimensional image filter drive device 183. The sum of the delay $\alpha$ and the delay $\beta$ may be referred to as a detection processing delay.

Mathematical expression 7 may be derived from mathematical expression 5 and mathematical expression 6.

$$1/FR > \alpha + \beta + \gamma + \delta \tag{7}$$

The camera 121 may be driven at a frame rate satisfying mathematical expression 7, and the controller 180 may control the camera 121 to be driven at a frame rate satisfying mathematical expression 7. Also, the camera 121 may be driven at a fixed frame rate satisfying mathematical expression 7 irrespective of change in illuminance of ambient light, and the controller 180 may control the camera 121 to be driven at a fixed frame rate satisfying mathematical expression 7.

In some embodiments, $T_t$ may be defined as the sum of at least one selected among from $\alpha$, $\beta$, $\gamma$ and $\delta$.

FIGS. 10A to 10D are block diagrams that illustrate operational modes of a controller according to another embodiment of the present disclosure. The controller 180 may include a position detection device 1010, a movement amount calculation device 1020, and a graphics processing device 1030.

The position detection device 1010 may receive image frames in which a user image has been captured from the camera 121 and detects a position of the user using the received image frames. The position detection device 1010 may recognize a face region to detect the position of the user. Here, the position detection device 1010 may recognize the face region using an algorithm based on symmetry of a face, an algorithm based on hair color and face color, and an algorithm based on the contour of a face. Also, the position detection device 1010 may calculate skin color information from the image frames to recognize a particular facial region.

The movement amount calculation device 1020 may calculate a movement amount of the three-dimensional image based on the detected position of the user and outputs the calculated movement amount of the three-dimensional image. Also, the movement amount calculation device 1020 may calculate a movement amount of the three-dimensional image using mathematical expression 1 and mathematical expression 2. The movement amount calculation device 1020 may output the calculated movement amount of the three-dimensional image to the graphics processing device 1030. Here, the calculated movement amount of the three-dimensional image refers to a movement amount of a position where a pixel value or a sub-pixel value of the three-dimensional image will displayed so that the three-dimensional image can be appropriately displayed corresponding to the position of the user detected by the position detection device 1010. Also, the movement amount of the three-dimensional image may be a movement amount of a pixel or a movement amount of a sub-pixel.

The graphics processing device 1030 may set a position at which each pixel value of the three-dimensional image is displayed. In some embodiments, the graphics processing device 1030 may set a position at which each pixel value of a plurality of view images included in the three-dimensional image is displayed on the display device 151, e.g., a display position, according to predefined rules.

The graphics processing device 1030 may change the set display position based on the movement amount of the three-dimensional image output from the position detection device 1010 to set a final display position. In some embodiments, the graphics processing device 1030 may set a position at which each pixel value of a plurality of view images included in the three-dimensional image is displayed on the display device 151, e.g., a display position, using predefined rules and the movement amount of the three-dimensional image output from the position detection device 1010.

Also, the graphics processing device 1030 may generate image data including pixel values or sub-pixel values arranged according to the set display position or the set final display position and may output the generated image data to the display device 151.

In the embodiment of FIGS. 10A to 10D, time delay $T_t$ may be defined as represented by mathematical expression 8 below:

$$T_t = \alpha + \beta + \varepsilon + \zeta \tag{8}$$

where $\alpha$ is a delay taken until image frames captured by the camera 121 are input to the controller 180, $\beta$ is a delay taken until a movement amount of a three-dimensional image is calculated using image frames input from the position detection device 610 and the movement amount calculation device 620, $\varepsilon$ is a delay taken until the graphics processing device 1030 generates image data based on the calculated movement amount of the three-dimensional image, and $\zeta$ is a delay taken until the generated image data are input to the display device 151. The sum of the delay $\varepsilon$ and the delay $\zeta$ may be designated as an image drive frame rate delay.

Mathematical expression 9 may be derived from mathematical expression 5 and mathematical expression 8, as follows:

$$1/FR > \alpha + \beta + \varepsilon + \zeta \tag{9}$$

The camera 121 may be driven at a frame rate satisfying mathematical expression 9, and the controller 180 may control the camera 121 to be driven at a frame rate satisfying mathematical expression 9. Also, the camera 121 may be driven at a fixed frame rate satisfying mathematical expression 9 irrespective of change in illuminance of ambient light, and the controller 180 may control the camera 121 to be driven at a fixed frame rate satisfying mathematical expression 9.

In some embodiments, $T_t$ may be defined as the sum of at least one selected among from $\alpha$, $\beta$, $\varepsilon$ and $\zeta$.

Figure 10A:
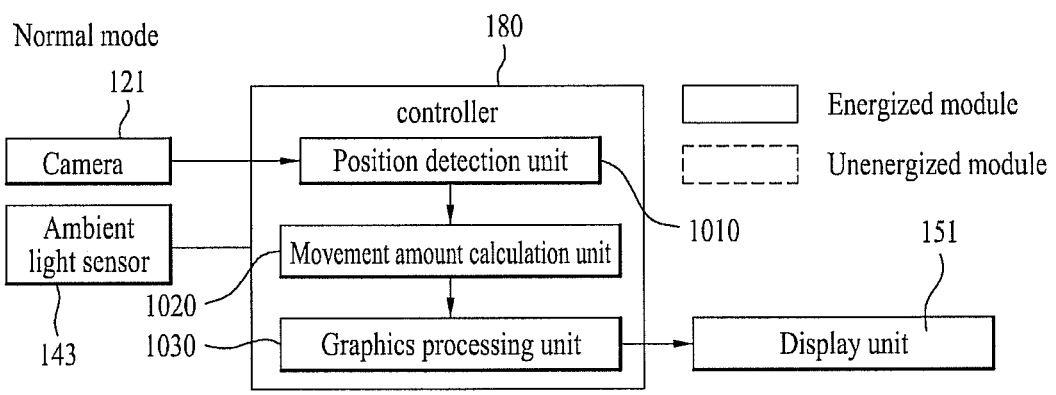
FIGS. 10A to 10D are block diagrams that illustrate operational modes of a controller according to another embodiment of the present disclosure.

Referring to FIG. 10A, in a case in which the mode of the tracking function is a normal mode, power is supplied to the camera 121, the ambient light sensor 143, the position detection device 1010, the movement amount calculation device 1020, and the graphics processing device 1030.

Figure 10B:
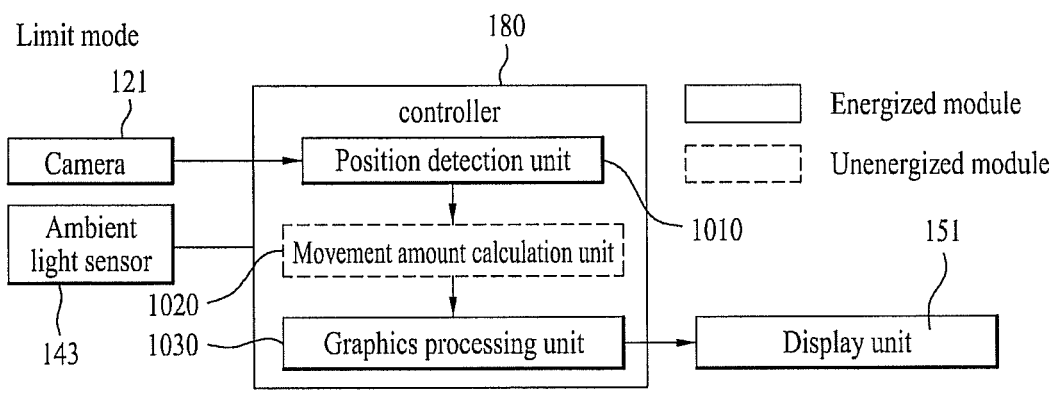

Referring to FIG. 10B, in a case in which the mode of the tracking function is a limit mode, power is supplied to the camera 121, the ambient light sensor 143, the position detection device 1010, and the graphics processing device 1030. However, power is not supplied to the movement amount calculation device 1020.

Figure 10C:
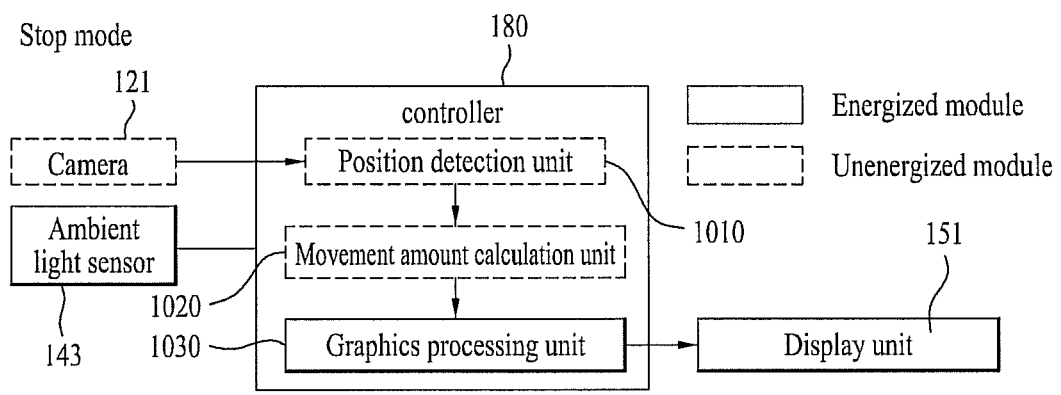

Referring to FIG. 10C, in a case in which the mode of the tracking function is a stop mode, power is supplied to the ambient light sensor 143 and the graphics processing device 1030. However, power is not supplied to the camera 121, the position detection device 1010, and the movement amount calculation device 1020.

Figure 10D:
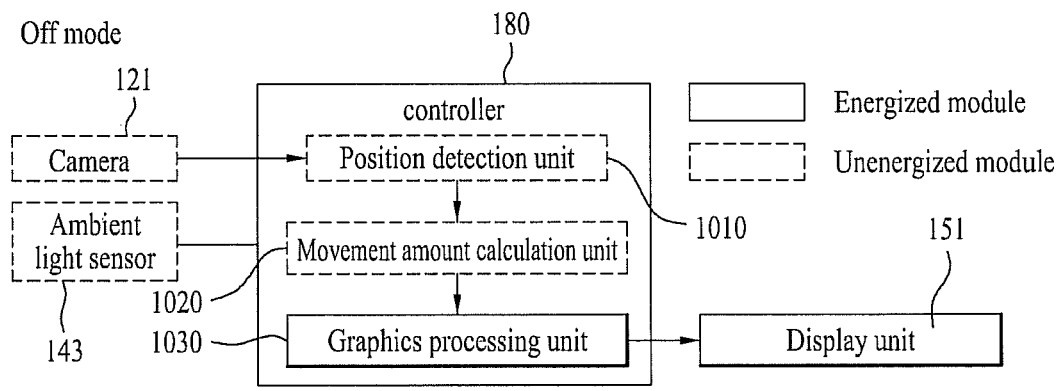

Referring to FIG. 10D, in a case in which the mode of the tracking function is an off mode, power is supplied to the graphics processing device 1030. However, power is not supplied to the camera 121, the ambient light sensor 143, the position detection device 1010, and the movement amount calculation device 1020.

That power is not supplied to the position detection device 1010 and the movement amount calculation device 1020 may mean that the position detection device 1010 and the movement amount calculation device 1020 are not operated and a corresponding load on the controller 180 may be reduced.

FIG. 11 is a diagram illustrating a movement of a sweet spot according to change in display position of a view image. In a case in which a display device 1110 displays a left view image at a point 1111 and a right view image at a point 1112 in a state in which a three-dimensional image filter 1101 is fixed, there is provided a sweet spot 1115 configured so that sweet spots 1117 that enable a user to view the left view image L displayed on the display device 1110 and sweet spots 1116 that enable the user to view the right view image R displayed on the display device 1110 are alternately arranged.

In a case in which a display device 1120 displays a left view image at a point 1121 and a right view image at a point 1122 in a state in which the three-dimensional image filter 1101 is fixed, there is provided a sweet spot 1125 configured so that sweet spots 1127 that enable a user to view the left view image L displayed on the display device 1120 and sweet spots 1126 that enable the user to view the right view image R displayed on the display device 1120 are alternately arranged.

In a case in which a display device 1130 displays a three-dimensional image using a left view image 1131 and a right view image 1132 in a state in which the three-dimensional image filter 1101 is fixed, there is provided a sweet spot 1135 configured so that sweet spots 1137 that enable a user to view the left view image L displayed on the display device 1130 and sweet spots 1136 that enable the user to view the right view image R displayed on the display device 1130 are alternately arranged.

In a case in which a display device 1140 displays a three-dimensional image using a left view image 1141 and a right view image 1142 in a state in which the three-dimensional image filter 1101 is fixed, there is provided a sweet spot 1145 configured so that sweet spots 1147 that enable a user to view the left view image L displayed on the display device 1140 and sweet spots 1146 that enable the user to view the right view image R displayed on the display device 1140 are alternately arranged.

In a case in which a display device 1150 displays a three-dimensional image using a left view image 1151 and a right view image 1152 in a state in which the three-dimensional image filter 1101 is fixed, there is provided a sweet spot 1155 configured so that sweet spots 1157 that enable a user to view the left view image L displayed on the display device 1150 and sweet spots 1156 that enable the user to view the right view image R displayed on the display device 1150 are alternately arranged.

In a case in which a display device 1160 displays a three-dimensional image using a left view image 1161 and a right view image 1162 in a state in which the three-dimensional image filter 1101 is fixed, there is provided a sweet spot 1165 configured so that sweet spots 1167 that enable a user to view the left view image L displayed on the display device 1160 and sweet spots 1166 that enable the user to view the right view image R displayed on the display device 1160 are alternately arranged.

In a case in which a display device 1170 displays a three-dimensional image using a left view image 1171 and a right view image 1172 in a state in which the three-dimensional image filter 1101 is fixed, there is provided a sweet spot 1175 configured so that sweet spots 1177 that enable a user to view the left view image L displayed on the display device 1170 and sweet spots 1176 that enable the user to view the right view image R displayed on the display device 1170 are alternately arranged.

The movement amount calculation device 1020 may decide that the display positions of the left view image and the right view image should be arranged according to one of the arrangement patterns of the view images 1110 to 1160 so as to move the sweet spot based on the point where the user is located. That is, the movement amount calculation device 1020 may calculate the movement amount of the three-dimensional image so that the current view images are arranged according to the set arrangement pattern of the view images. For example, in a case in which the left eye of the user is located at the point 1117 and the right eye of the user is located at the point 1118, the movement amount calculation device 1020 decides that the view images should be arranged according to the arrangement pattern of the view images 1110 so that the sweet spot 1115 is provided.

In a case in which the left eye of the user moves from the point 1117 to the point 1137, the movement amount calculation device 1020 may decide that the view images arranged according to the arrangement pattern of the view images 1110 should be changed into the view images arranged according to the arrangement pattern of the view images 1130 so that the sweet spot 1135 is provided. That is, the movement amount calculation device 1020 may calculate the movement amount of the three-dimensional image based on the movement amount of the view images from the arrangement pattern of the view images 1110 to the arrangement pattern of the view images 1130.

FIGS. 12A to 12D are block diagrams that illustrate operational modes of a controller according to another embodiment of the present disclosure. The controller 180 may include a position detection device 1210, a velocity calculation device 1220, a position estimation device 1230, a movement amount calculation device 1240, and a communication controller 1250.

The position detection device 1210 may receive image frames in which a user image has been captured from the camera 121 and detects a position of the user using the received image frames. The position detection device 1210 may recognize a face region to detect the position of the user. Here, the position detection device 1210 may recognize the face region using an algorithm based on symmetry of a face, an algorithm based on hair color and face color, and an algorithm based on the contour of a face. Also, the position detection device 1210 may calculate skin color information from the image frames to recognize a particular facial region.

The velocity calculation device 1220 may calculate velocity of movement of the user using at least one selected from among the currently detected position of the user and the previously detected position of the user. The position estimation device 1230 may estimate a position of the user when a predetermined time elapses using the detected position of the user and the calculated velocity of movement of the user.

The movement amount calculation device 1240 may calculate a position of the three-dimensional image filter and a movement amount of the three-dimensional image filter based on the detected position of the user or the estimated position of the user, and outputs the calculated movement amount of the three-dimensional image filter. The movement amount of the three-dimensional image filter may be calculated and output for each of the detected positions of the user or each of the estimated positions of the user.

Also, the movement amount calculation device 1240 may generate a control signal to control movement of the non-transmission regions of the three-dimensional image filter according to the current position of the three-dimensional image filter and the calculated movement amount of the three-dimensional image filter, and may output the generated control signal to the communication controller 1250. The control signal may be calculated and output for each of the detected positions of the user or each of the estimated positions of the user. The generated control signal may be a signal to enable the non-transmission regions of the three-dimensional image filter to be located at a point away from the current point by the calculated movement amount of the three-dimensional image filter. Alternatively, the generated control signal may be a signal to enable the non-transmission regions of the three-dimensional image filter to be located at a point away from a point for the non-transmission regions corresponding to a previous control signal based on the calculated movement amount of the three-dimensional image filter.

In some embodiments, the movement amount calculation device 1240 may find the positions of the transmission regions and the non-transmission regions of the three-dimensional image filter having sweet spots corresponding to the detected position of the user or the estimated position of the user, and may calculate differences between the found positions of the transmission regions and the non-transmission regions of the three-dimensional image filter and the current positions of the transmission regions and the non-transmission regions of the three-dimensional image filter or the positions of the transmission regions and the non-transmission regions of the three-dimensional image filter indicated by the previous control signal to obtain a movement amount of the three-dimensional image filter.

In some embodiments, the movement amount calculation device 1240 may calculate the position of the lens and the movement amount of the lens based on the detected position of the user or the estimated position of the user, and may output the calculated position of the lens and the calculated movement amount of the lens. The calculated position of the lens and the calculated movement amount of the lens may be output to the three-dimensional image filter drive device 183.

The movement amount calculation device 1240 may generate a control signal to control movement of the lens according to the current position of the lens or the position of the lens indicated by the previous control signal and the calculated movement amount of the lens, and may output the generated control signal to the communication controller 1250. The generated control signal may be a signal to enable the lens to be located at a point away from the current point by the calculated movement amount of the lens or may be a signal to enable the lens to be located at a point away from the point of the lens which the previous control signal indicates by the calculated movement amount of the lens.

The communication controller 1250 may transmit the control signal generated by the movement amount calculation device 1240 to the three-dimensional image filter drive device 183. Here, the transmitted control signal may include a control signal generated based on the detected position of the user and a control signal generated based on the estimated position of the user. The control signals may be transmitted in order of generation. The communication controller 1250 may output the control signal to the three-dimensional image filter drive device 183 in an I2C communication fashion.

FIGS. 13 to 16 are views showing image frames of a user captured by the camera. The position detection device 1210 may detect a position 1311 of the user using an image frame 1300. The position detection device 1210 may recognize a face region in an image frame 1400 to detect a position 1321 of the user.

The velocity calculation device 1220 may calculate velocity V of the movement of the user from mathematical expression 10 below using the currently detected position 1321 of the user and the previously detected position 1311 of the user.

$$V = H/T \qquad (10)$$

where H is a distance between the currently detected position 1321 of the user and the previously detected position 1311 of the user, and T is a time interval between the image frame 1300 and the image frame 1400.

The velocity calculation device 1220 may calculate a position of the user after a predetermined amount of time elapses according to the following algorithm using the detected position 1321 of the user and the movement velocity V.

$$\text{for } (k=1, k<N+1, k++) \qquad A(1)$$

$$\{\text{a position of a user at delay time}+kt\}$$

where delay time+kt may be a predetermined time period, and the delay time may be time delayed by at least one selected from among camera capture delay, detection processing delay, or image driver frame rate delay.

Here, t may be set as represented by mathematical expression 11 below:

$$t = (1/M)/N \qquad (11)$$

where M is the maximum frame rate of the camera, and N may be set as represented by mathematical expression 12 below:

$$N > (v*t)/T \quad (12)$$

where T is a threshold of head position change at which image change occurs.

The position P of the user at delay time+kt may be calculated as represented by mathematical expression 13 below:

$$P = P_0 + VT \quad (13)$$

where, $P_0$ is a detection position of the user, and T is delay time+kt.

According to algorithm 1, the position estimation device 1230 may estimate N positions of the user at time intervals of t during capture of the image frames, in a case in which a camera captures images at a frame rate of M Hz. Therefore, it is possible to achieve the same effect as in using a camera which performs capture at a frame rate of M*N Hz.

When an image frame 1500 has been captured, the position detection device 1210 may detect a position 1331 of the user, and the velocity calculation device 1220 may calculate velocity V of the movement of the user using at least one of the previously detected positions 1311 and 1321 of the user.

Also, when an image frame 1600 has been captured, the position detection device 1210 may detect a position 1341 of the user, and the velocity calculation device 1220 may calculate velocity V of the movement of the user using at least one of the previously detected positions 1311, 1321 and 1331 of the user.

In the embodiment of FIG. 12, a frame rate FR of the camera 121 may be set as represented by mathematical expression 14 below:

$$1/FR > \alpha + \beta + \gamma + \delta - N\eta + N\delta \quad (14)$$

where $\alpha$ is a time delay taken until image frames captured by the camera 121 are input to the controller 180, $\beta$ is a time delay taken until a control signal is calculated using image frames input from the position detection device 1210 and the movement amount calculation device 1240, $\gamma$ is a time delay taken until the communication controller 1250 starts to transmit the generated control signal to the three-dimensional image filter drive device 183, $\delta$ is a time delay taken until the generated control signal passes from the communication controller 1250 to the three-dimensional image filter drive device 183, N is the number of times the user's position is estimated. Here, $\eta$ may be calculated as represented by mathematical expression 15 below:

$$\eta = [1/(N+1)] \times [1/FR] \quad (15)$$

The camera 121 may be driven at a frame rate satisfying mathematical expression 14, and the controller 180 may control the camera 121 to be driven at a frame rate satisfying mathematical expression 14. Also, the camera 121 may be driven at a fixed frame rate satisfying mathematical expression 14 irrespective of a change in illuminance of ambient light, and the controller 180 may control the camera 121 to be driven at a fixed frame rate satisfying mathematical expression 14.

Figure 12A:
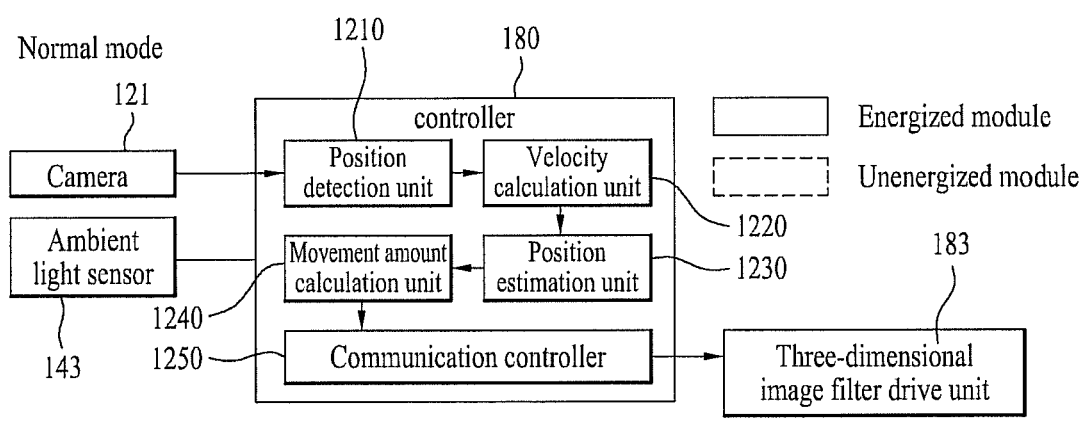
FIGS. 12A to 12D are block diagrams that illustrate operational modes of a controller according to another embodiment of the present disclosure.

Referring to FIG. 12A, in a case in which the mode of the tracking function is a normal mode, power may be supplied to the camera 121, the ambient light sensor 143, the position detection device 1210, the velocity calculation device 1220, the position estimation device 1230, the movement amount calculation device 1240, and the communication controller 1250.

Figure 12B:
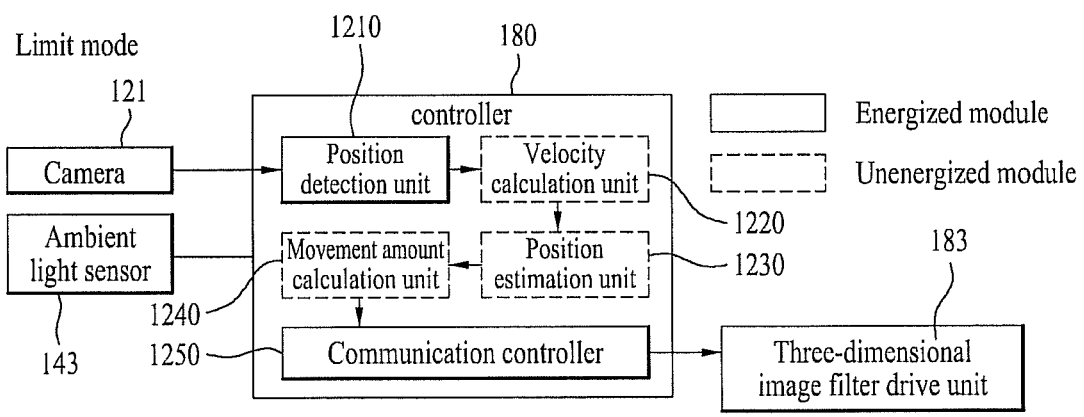

Referring to FIG. 12B, in a case in which the mode of the tracking function is a limit mode, power may be supplied to the camera 121, the ambient light sensor 143, the position detection device 1210, and the communication controller 1250; however, power is not supplied to the velocity calculation device 1220, the position estimation device 1230, and the movement amount calculation device 1240.

Figure 12C:
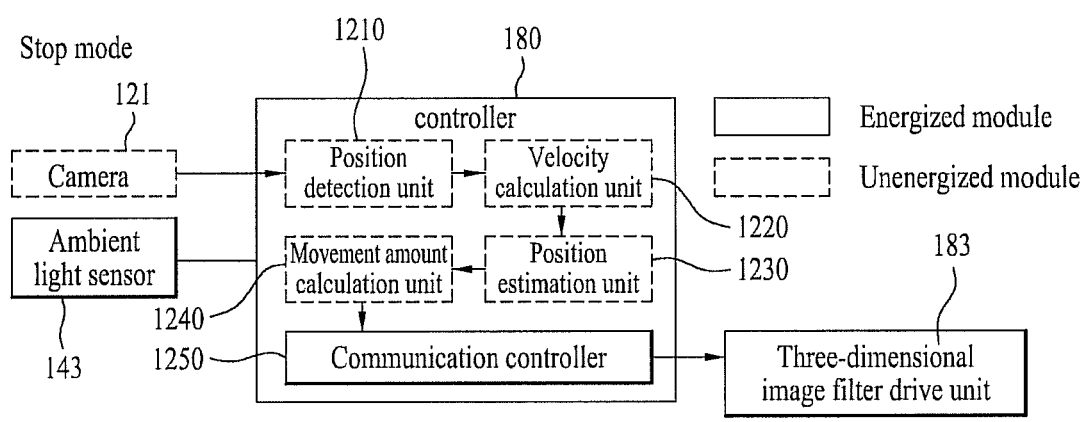

Referring to FIG. 12C, in a case in which the mode of the tracking function is a stop mode, power may be supplied to the ambient light sensor 143 and the communication controller 1250; however, power is not supplied to the camera 121, the velocity calculation device 1220, the position estimation device 1230, and the movement amount calculation device 1240.

Figure 12D:
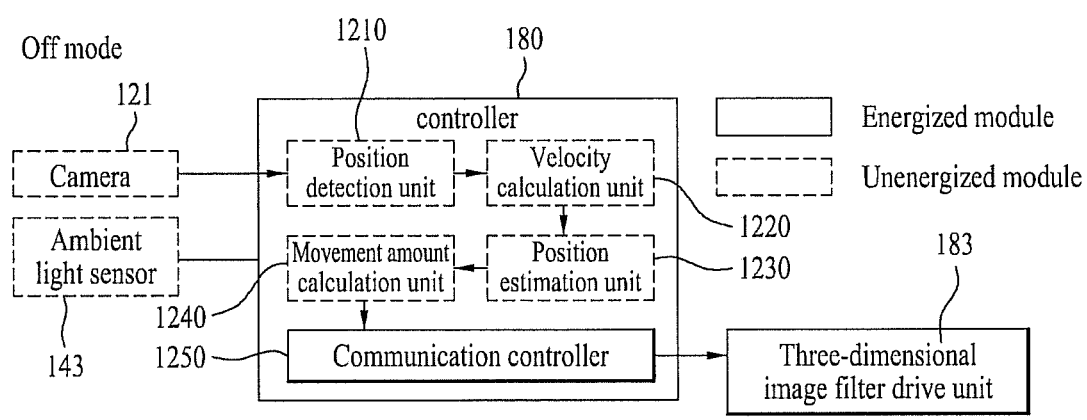
Figure 13:
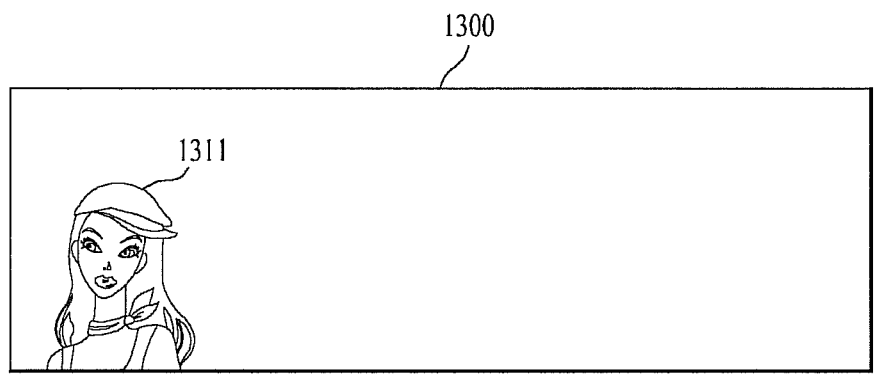
FIGS. 13 to 16 are views showing image frames of a user captured by a camera.
Figure 14:
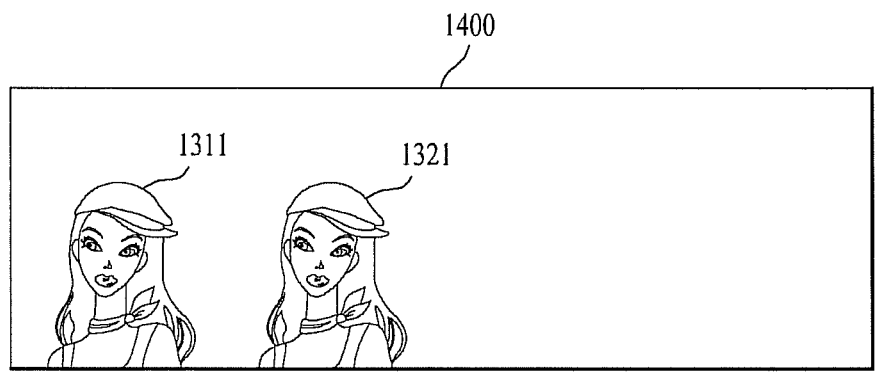
Figure 15:
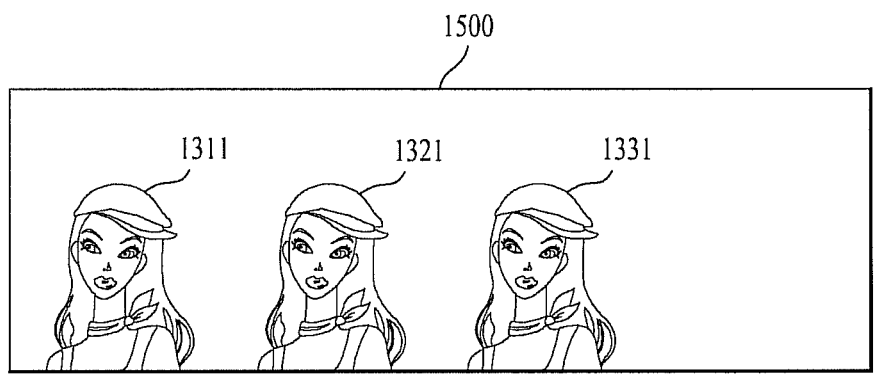
Figure 16:
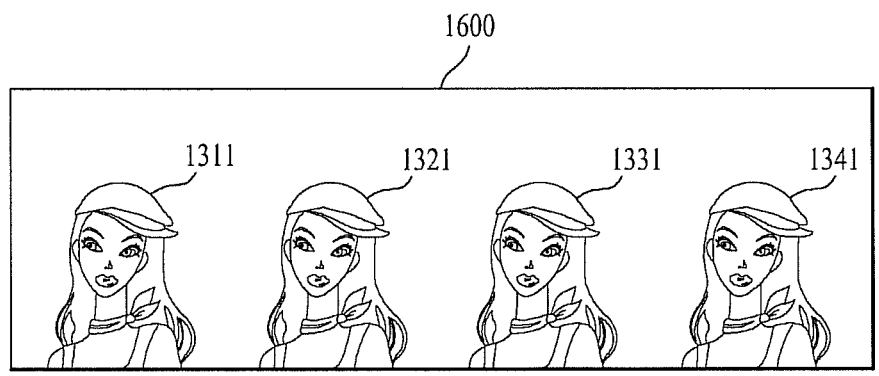

Referring to FIG. 12D, in a case in which the mode of the tracking function is an off mode, power may be supplied to the communication controller 1250. However, power is not supplied to the camera 121, the ambient light sensor 143, the velocity calculation device 1220, the position estimation device 1230, and the movement amount calculation device 1240. Hence, the load as well as power consumed by the controller 180 associated with the these terminated processes are reduced or eliminated.

In some embodiments, in a case in which the mode of the tracking function is not a normal mode, power may not be supplied to the communication controller 1250. That power is not supplied to the position detection device 1210, the velocity calculation device 1220, the position estimation device 1230, the movement amount calculation device 1240, and the communication controller 1250 may mean that the position detection device 1210, the velocity calculation device 1220, the position estimation device 1230, the movement amount calculation device 1240, and the communication controller 1250 are not operated, thereby reducing the load of the controller 180 and the associates power consumed.

FIGS. 17A to 17D are block diagrams that illustrate operational modes of a controller according to a further embodiment of the present disclosure. The controller 180 may include a position detection device 1710, a velocity calculation device 1720, a position estimation device 1730, a movement amount calculation device 1740, and a graphics processing device 1750. The position detection device 1710, the velocity calculation device 1720, and the position estimation device 1730 correspond to the position detection device 1210, the velocity calculation device 1220, and the position estimation device 1230 of FIG. 12, and therefore, a detailed description thereof will be omitted. Also, the graphics processing device 1750 corresponds to the graphics processing device 1030 of FIG. 10.

The movement amount calculation device 1740 may calculate a pixel movement amount at specific timing using mathematical expression 1 and mathematical expression 2 based on the position of a user estimated at the specific timing. Referring to FIG. 11, when the left eye of the user is located at the point 1116 and the right eye of the user is located at the point 1117, the view images are arranged according to the arrangement pattern of the view images 1110. The position estimation device 1730 estimates the position 1136 of the left eye of the user and the position 1137 of the right eye of the user and calculates a pixel movement amount A based on the estimated movement positions 1136 and 1137. When the user moves from the positions 1116 and 1117 to the positions 1136 and 1137, the graphics processing device 1750 performs processing so that the three-dimensional image is moved based on the pixel movement amount A calculated according to movement timing. Consequently, the view images are displayed according to the arrangement pattern of the view images 1130.

In the embodiment of FIG. 17, a frame rate FR of the camera 121 may be set as represented by mathematical expression 16 below:

$$1/FR > \alpha + \beta + \varepsilon + \zeta - N\eta + N\zeta \quad (16)$$

where, α is a time delay until image frames captured by the camera 121 are input to the controller 180, β is a delay taken until a control signal is calculated using image frames input from the position detection device 1710 and the movement amount calculation device 1740, ε is a delay taken until the graphics processing device 1750 generates image data based on the calculated movement amount of the three-dimensional image, ζ is a delay taken until the generated image data are input to the display device 151, and N is the number of times of estimation of the user's position. Here, η may be calculated as represented by mathematical expression 15 above.

The camera 121 may be driven at a frame rate satisfying mathematical expression 16, and the controller 180 may control the camera 121 to be driven at a frame rate satisfying mathematical expression 16. Also, the camera 121 may be driven at a fixed frame rate satisfying mathematical expression 16 irrespective of changes in the illuminance of ambient light, and the controller 180 may control the camera 121 to be driven at a fixed frame rate satisfying mathematical expression 16.

Figure 17A:
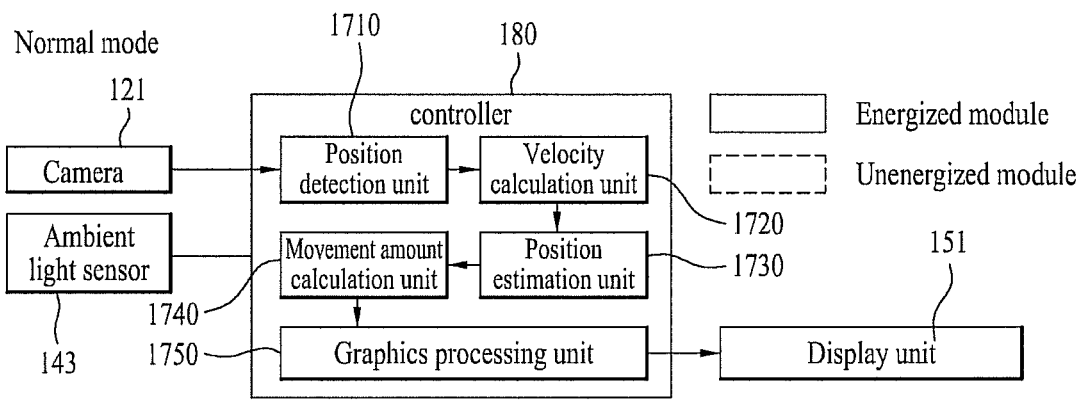
FIGS. 17A to 17D are block diagrams that illustrate operational modes of a controller according to a further embodiment of the present disclosure.

Referring to FIG. 17A, in a case in which the mode of the tracking function is a normal mode, power is supplied to the camera 121, the ambient light sensor 143, the position detection device 1710, the velocity calculation device 1720, the position estimation device 1730, the movement amount calculation device 1740, and the graphics processing device 1750.

Figure 17B:
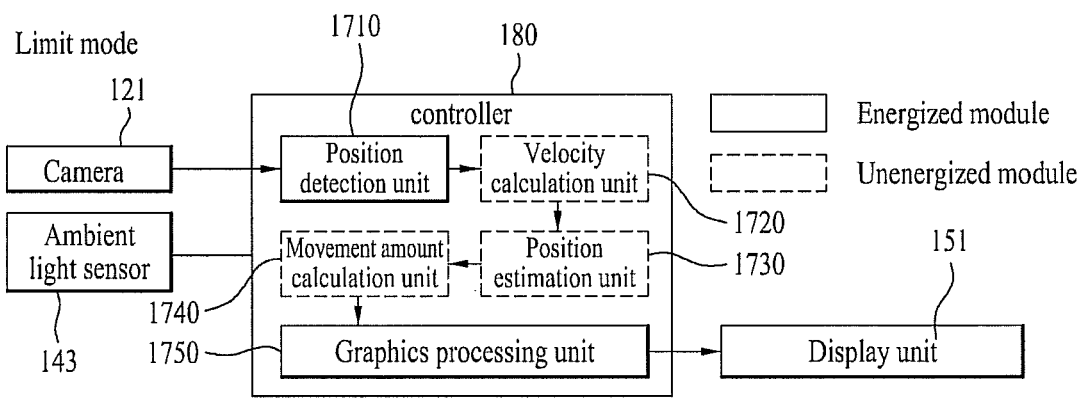

Referring to FIG. 17B, in a case in which the mode of the tracking function is a limit mode, power is supplied to the camera 121, the ambient light sensor 143, the position detection device 1710, and the graphics processing device 1750. However, power is not supplied to the velocity calculation device 1720, the position estimation device 1730, and the movement amount calculation device 1740.

Figure 17C:
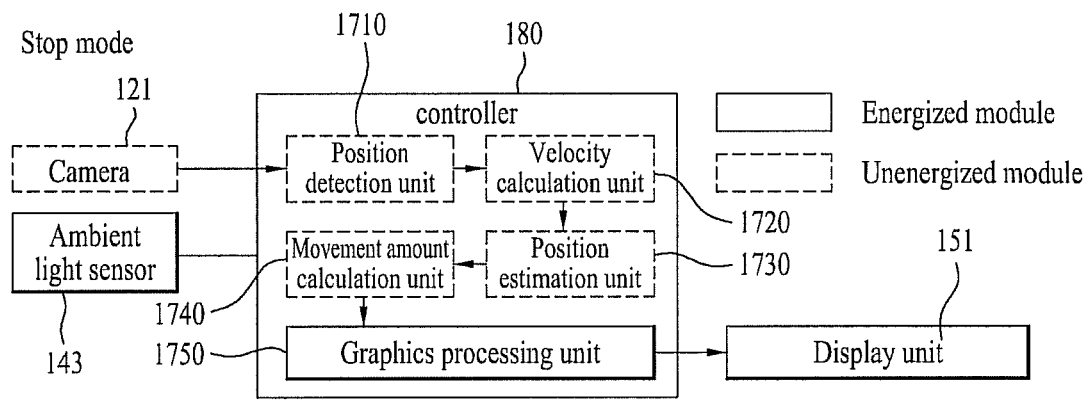

Referring to FIG. 17C, in a case in which the mode of the tracking function is a stop mode, power is supplied to the ambient light sensor 143 and the graphics processing device 1750. However, power is not supplied to the camera 121, the velocity calculation device 1720, the position estimation device 1730, and the movement amount calculation device 1740.

Figure 17D:
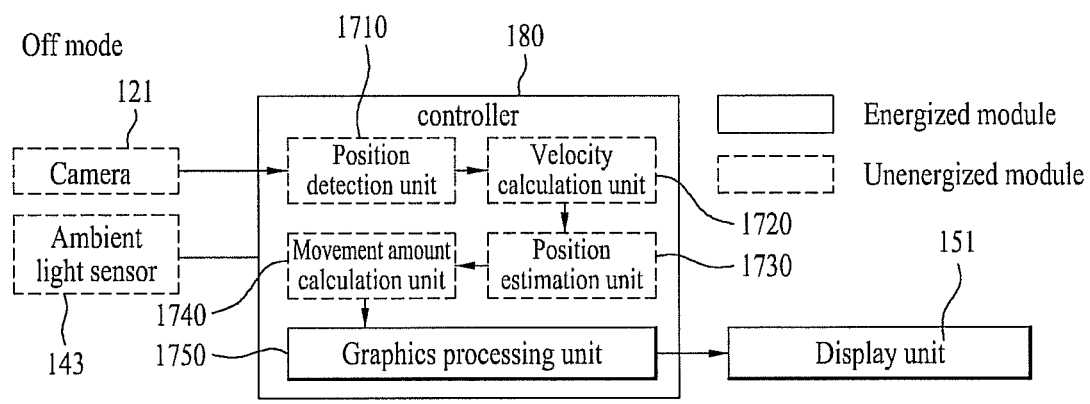

Referring to FIG. 17D, in a case in which the mode of the tracking function is an off mode, power is supplied to the graphics processing device 1750. However, power is not supplied to the camera 121, the ambient light sensor 143, the velocity calculation device 1720, the position estimation device 1730, and the movement amount calculation device 1740.

That power is not supplied to the position detection device 1710, the velocity calculation device 1720, the position estimation device 1730, and the movement amount calculation device 1740 may mean that the position detection device 1710, the velocity calculation device 1720, the position estimation device 1730, and the movement amount calculation device 1740 are not operated and the load to the controller 180 associated with these processes may be reduced.

Figure 18:
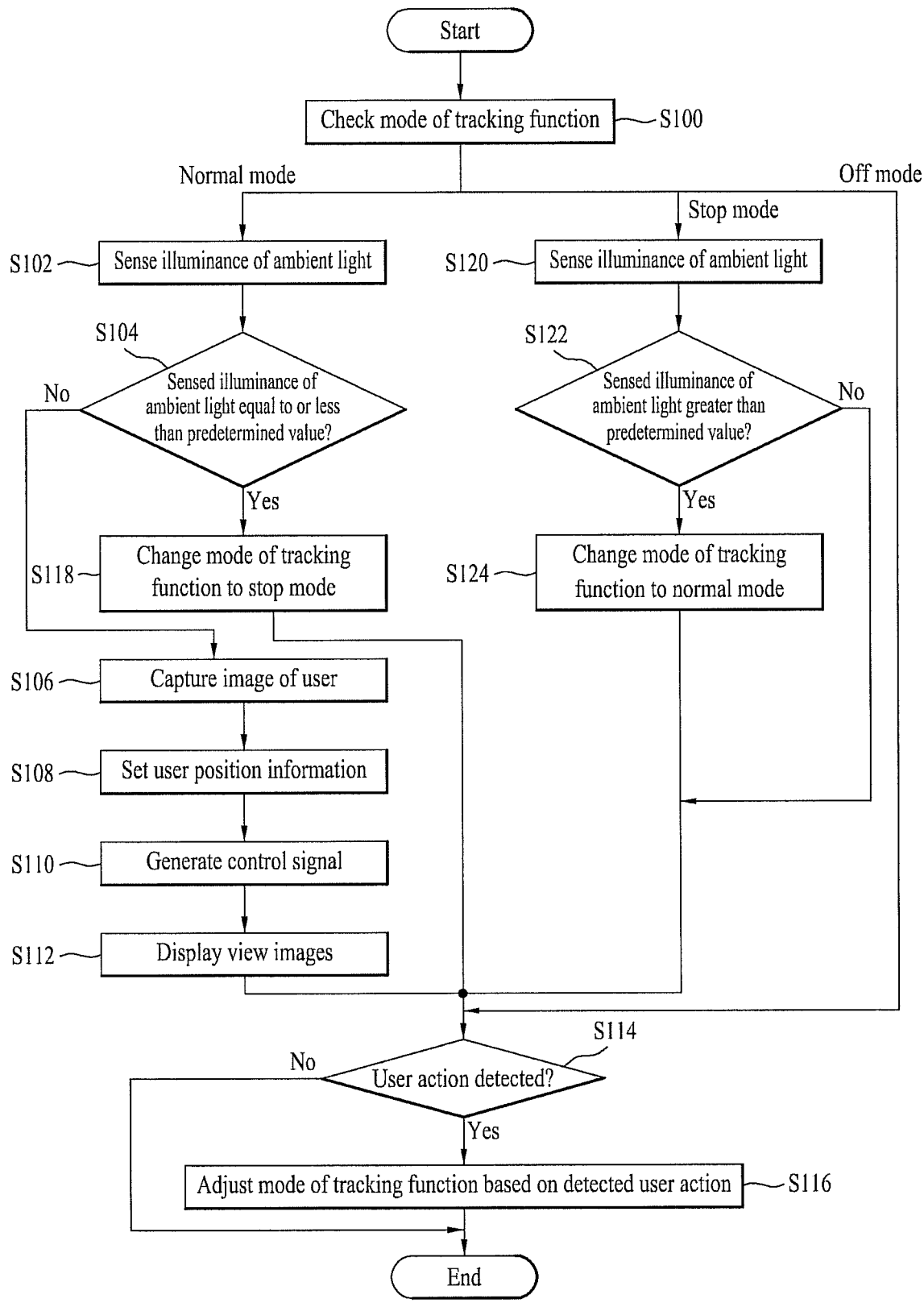
FIG. 18 is a flow chart of a method of controlling a three-dimensional image processing apparatus according to an embodiment of the present disclosure.

FIG. 18 is a flow chart of an electric power control method of a three-dimensional image processing apparatus according to an embodiment of the present disclosure. The controller 180 may check a mode of the tracking function, in step S100.

In a case in which the mode of the tracking function is a normal mode, the ambient light sensor 143 senses the illuminance of ambient light, in step S102. Here, the three-dimensional image processing apparatus 100 according to the present disclosure may be in one of the power applied states in the normal modes shown in FIGS. 6A, 10A, 12A and 17A. Also, the controller 180 may control the supply of power from the power supply device 190 so that the three-dimensional image processing apparatus 100 is in one of the power applied states in the normal modes shown in FIGS. 6A, 10A, 12A and 17A.

The controller 180 may check the illuminance of the ambient light sensed by the ambient light sensor 143, in step S104. Here, the controller 180 may determine whether the illuminance of the ambient light is equal to or less than a predetermined value. Also, the predetermined value may be set by the controller 180 based on at least one selected from among a method of extracting a picture image of a user based on an image captured by the camera 121 and performance of a capturing element of the camera 121.

Upon determining that the illuminance of the ambient light is greater than the predetermined value, the camera 121 may capture a user image, in step S106. The controller 180 may set user position information related to a position of the user using the image captured by the camera 12, in step S108. Here, step S108 may be carried out by the position detection device 610 shown in FIG. 6, the position detection device 1010 shown in FIG. 10, the position detection device 1210 shown in FIG. 12, or the position detection device 1710 shown in FIG. 17.

The controller 180 may generate a control signal to control display of view images based on the set user position information, in step S110. Here, step S110 may be carried out by the movement amount calculation device 620 shown in FIG. 6, the movement amount calculation device 1020 shown in FIG. 10, the movement amount calculation device 1240 shown in FIG. 12, or the movement amount calculation device 1740 shown in FIG. 17. Also, the control signal may include at least one selected from among a control signal to control movement of the lens of the lenticular lens board, a control signal to control movement of the non-transmission region of the parallax barrier, and a control signal to control positions at which view images are to be displayed on the display device 151. Also, the mode of the tracking function may include at least one selected from among an off mode in which the tracking function is not executed and an on mode in which the tracking function is executed. The on mode may include at least one selected from among a stop mode in which performance of the tracking function is stopped, a limit mode in which the execution of the tracking function is limited, and a normal mode in which the tracking function is normally executed. The display device 151 may display the view images, in step S112.

The controller 180 may determine whether user action to request switching between tracking function modes has been detected, in step S114. The user action to request switching between tracking function modes may be performed through a graphical user interface GUI shown in FIG. 19.

Figure 19A:
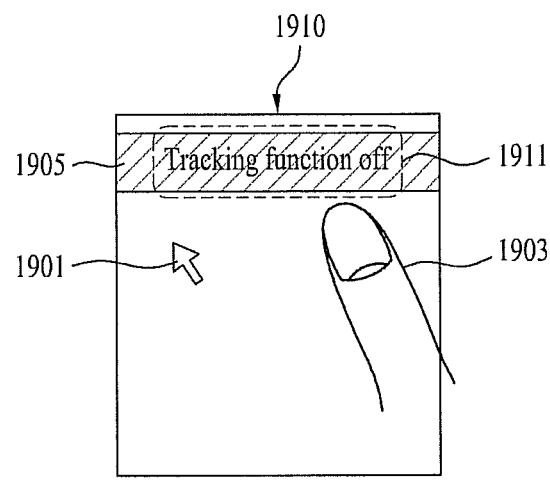
FIGS. 19A and 19B are views of a graphical user interface (GUI) to allow a user to input a request for switching between tracking function modes.
Figure 19B:
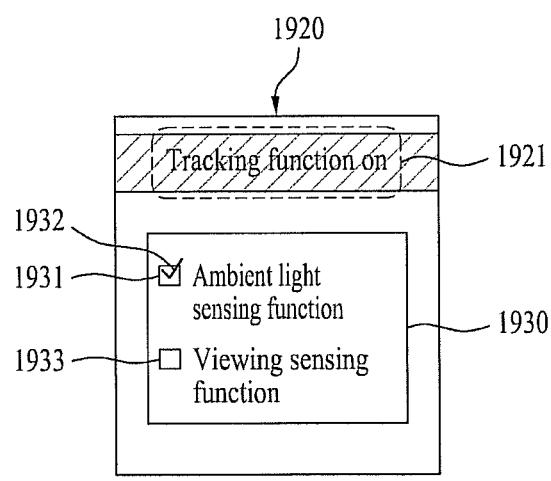

FIGS. 19A to 19B are views of a graphical user interface (GUI) to allow a user to input a request for switching between tracking function modes. A GUI 1910 of FIG. 19A may include a menu item 1911 to set a tracking function. The menu item 1911 may indicate "tracking function off."

"Tracking function off" means that the mode of the tracking function is set to an off mode.

The user may place a pointer 1901 or an indicator 1905 on the menu item 1911 and click a button (for example, an OK button) on the remote control to perform user action to request switching between tracking function modes. Also, the user may touch the menu item 1911 using a finger 1903 to perform user action to request switching between tracking function modes.

In a case in which the user action to request switching between tracking function modes has been detected in a state in which the GUI 1910 is displayed, the controller 180 may control a GUI 1920 of FIG. 19B to be displayed in response to the detected user action.

The GUI 1920 may include a menu item 1921 to set a tracking function. The menu item 1921 may indicate "tracking function on." "Tracking function on" means that the mode of the tracking function is set to an on mode. The message 1911 and the message 1921 may be toggled between each other depending upon user action to request switching between tracking function modes.

Also, in a case in which the user action to request display of a GUI to set a tracking function has been sensed, the GUI 1910 or the GUI 1920 may be selectively displayed. In a case in which the current tracking function is set to an off mode, the GUI 1910 may be displayed in response to the user action. In a case in which the current tracking function is set to an on mode, the GUI 1920 may be displayed in response to the user action.

In some embodiments, the message 1911 and the message 1921 may be the same. In this case, the message 1911 and the message 1921 may be displayed using different colors, thicknesses, sizes and highlights. For example, the message 1921 may be displayed thicker or larger than the message 1911.

In some embodiments, the GUI 1920 may further include a condition region 1930. The condition region 1930 may include at least one selected from among a menu item 1931 and a menu item 1933 to set the details of the tracking function. The condition region 1930 may be displayed when the message 1911 is toggled to the message 1921.

The menu item 1931 may be provided to set an ambient light sensing function. The ambient light sensing function is a function to adjust the mode of the tracking function based on the illuminance of the ambient light sensed by the ambient light sensor 143. When the user performs user action to select the menu item 1931, a check mark 1932 is displayed on the menu item 1931, and the ambient light sensing function is set. When the check mark 1932 is displayed on the menu item 1931, the controller 180 performs the ambient light sensing function.

The menu item 1933 may be provided to set a viewing sensing function. The viewing sensing function is a function to adjust a mode of the tracking function depending upon whether the user is in a viewing zone. When the user perform user action to select the menu item 1933, a check mark is displayed on the menu item 1931, and the viewing sensing function is set. When the check mark is displayed on the menu item 1933, the controller 180 may perform the viewing sensing function. The user may individually set and release the ambient light sensing function and the viewing sensing function.

When the user action has been detected, the controller 180 may adjust a mode of the tracking function based on the detected user action, in step S116. When the detected user action requests switching to an off mode, the controller 180 may adjust the mode of the tracking function to the off mode.

Also, when the detected user action requests switching to an on mode, the controller 180 may adjust the mode of the tracking function to the on mode. The on mode may be a normal mode.

In some embodiments, when a two-dimensional image is displayed after a three-dimensional image is displayed, the controller 180 may adjust the mode of the tracking function to an off mode. In some embodiments, when a three-dimensional image is displayed after a two-dimensional image is displayed, the controller 180 may automatically adjust the mode of the tracking function to a normal mode.

In some embodiments, when a three-dimensional image is displayed after a two-dimensional image is displayed, the controller 180 may adjust the mode of the tracking function to a predetermined mode. Here, the predetermined mode may be a mode of the tracking function adjusted based on the detected user action.

Referring again to FIG. 18, when the sensed illuminance of the ambient light is determined to be equal to or less than a predetermined value, the controller 180 may change the mode of the tracking function to a stop mode, in step S118.

In a case in which the mode of the tracking function is the stop mode, the ambient light sensor 143 may sense the illuminance of ambient light, in step S120. Here, the three-dimensional image processing apparatus 100 according to the present disclosure may be in one of the power applied states in the stop modes shown in FIGS. 6C, 10C, 12C and 17C. Also, the controller 180 may control the supply of power from the power supply device 190 so that the three-dimensional image processing apparatus 100 is in one of the power applied states in the stop modes shown in FIGS. 6C, 10C, 12C and 17C.

The controller 180 may check the illuminance of the ambient light detected by the ambient light sensor 143, in step S122. Here, the controller 180 may determine whether the illuminance of the ambient light is greater than a predetermined value. Upon determining that the illuminance of the ambient light is greater than the predetermined value, the controller 180 may change the mode of the tracking function to a normal mode, in step S124.

In a case in which the mode of the tracking function is an off mode, step S114 may be carried out. Here, the three-dimensional image processing apparatus 100 according to the present disclosure may be in one of the power applied states in the off modes shown in FIGS. 6D, 10D, 12D and 17D. Also, the controller 180 may control the supply of power from the power supply device 190 so that the three-dimensional image processing apparatus 100 is in one of the power applied states in the off modes shown in FIGS. 6D, 10D, 12D and 17D.

Figure 20:
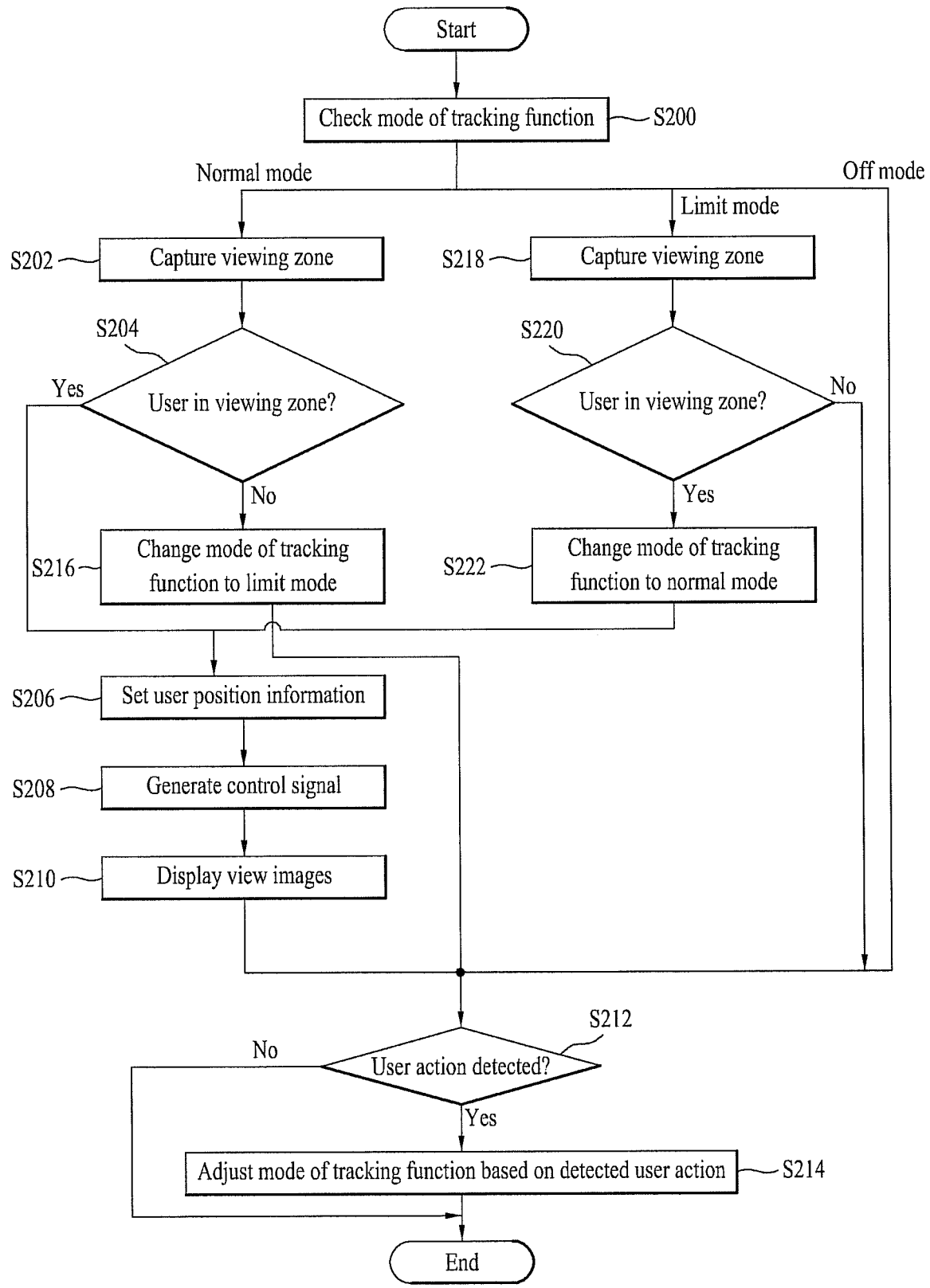
FIG. 20 is a flow chart of a method of controlling a three-dimensional image processing apparatus according to another embodiment of the present disclosure.

FIG. 20 is a flow chart of a method of controlling a three-dimensional image processing apparatus according to another embodiment of the present disclosure. The controller 180 may check a mode of the tracking function, in step S200.

In a case in which the mode of the tracking function is a normal mode, the camera 121 may capture images within a viewing zone to enable a user to view a three-dimensional image displayed by the three-dimensional image processing apparatus 100, in step S202. Here, the three-dimensional image processing apparatus 100 according to the present disclosure may be in one of the power applied states in the normal modes shown in FIGS. 6A, 10A, 12A and 17A. Also, the controller 180 may control the supply of power from the power supply device 190 so that the three-dimensional image processing apparatus 100 is in one of the power applied states in the normal modes shown in FIGS. 6A, 10A, 12A and 17A.

The controller 180 may determine whether the user is in the viewing zone through the camera 121, in step S204. Here, step S204 may be carried out by the position detection device 610 shown in FIG. 6, the position detection device 1010 shown in FIG. 10, the position detection device 1210 shown in FIG. 12, and the position detection device 1710 shown in FIG. 17.

Upon determining that the user is in the viewing zone, the controller 180 may set user position information related to a position of the user using the image captured by the camera 121, in step S206. Here, step S206 may be carried out by the position detection device 610 shown in FIG. 6, the position detection device 1010 shown in FIG. 10, the position detection device 1210 shown in FIG. 12, and the position detection device 1710 shown in FIG. 17.

The controller 180 may generate a control signal to control a display of view images based on the set user position information, in step S208. Here, step S208 may be carried out by the movement amount calculation device 620 shown in FIG. 6, the movement amount calculation device 1020 shown in FIG. 10, the movement amount calculation device 1240 shown in FIG. 12, and the movement amount calculation device 1740 shown in FIG. 17.

Also, the control signal may include at least one selected from among a control signal to control movement of the lens of the lenticular lens board, a control signal to control movement of the non-transmission region of the parallax barrier, and a control signal to control positions at which view images are to be displayed on the display device 151. Also, the mode of the tracking function may include at least one selected from among an off mode in which the tracking function is not executed and an on mode in which the tracking function is executed. The on mode may include at least one selected from among a stop mode in which the execution of the tracking function is stopped, a limit mode in which the tracking function is limitedly executed, and a normal mode in which the tracking function is normally executed. Moreover, the display device 151 displays the view images, in step S210.

The controller 180 may determine whether a request (e.g., user action) to switch between tracking function modes has been detected, in step S212. The request to switch between tracking function modes may be a user action performed through the graphical user interface GUI shown in FIG. 19.

When the user action has been detected, the controller 180 may adjust a mode of the tracking function based on the detected user action, in step S214. When the detected user action requests switching to an off mode, the controller 180 adjusts the mode of the tracking function to the off mode. Also, when the detected user action requests switching to an on mode, the controller 180 adjusts the mode of the tracking function to the on mode. The on mode may be a normal mode.

In some embodiments, when a two-dimensional image is displayed after a three-dimensional image is displayed, the controller 180 may adjust the mode of the tracking function to an off mode. In some embodiments, when a three-dimensional image is displayed after a two-dimensional image is displayed, the controller 180 may automatically adjust the mode of the tracking function to a normal mode. In some embodiments, when a three-dimensional image is displayed after a two-dimensional image is displayed, the controller 180 may adjust the mode of the tracking function to a predetermined mode. Here, the predetermined mode may be a mode of the tracking function adjusted based on the detected user action.

When it is determined that the user is not in the viewing zone, in step S240, the controller 180 may change the mode of the tracking function to a limit mode, in step S216.

In a case in which the mode of the tracking function is determined to be the limit mode, in step S200, the camera 121 may capture images in a viewing zone to enable the user to view a three-dimensional image displayed by the three-dimensional image processing apparatus 100, in step S218. Here, the three-dimensional image processing apparatus 100 according to the present disclosure may be in one of the power applied states in the limit modes shown in FIGS. 6B, 10B, 12B and 17B. Also, the controller 180 may control the supply of power from the power supply device 190 so that the three-dimensional image processing apparatus 100 is in one of the power applied states in the limit modes shown in FIGS. 6B, 10B, 12B and 17B.

The controller 180 may determine whether the user is in the viewing zone using the image captured by the camera 121, in step S220. Here, step S220 may be carried out by the position detection device 610 shown in FIG. 6, the position detection device 1010 shown in FIG. 10, the position detection device 1210 shown in FIG. 12, and the position detection device 1710 shown in FIG. 17.

Upon determining that the user is in the viewing zone, in step S220, the controller 180 may change the mode of the tracking function to a normal mode, in step S222. Step 206 may be carried out after step S222 is carried out. In some embodiments, step 212 may be carried out after step S222 is carried out. Upon determining that the user is not in the viewing zone, in step S220, step S212 may be carried out to determine when an input (e.g., user action) has been detected.

When the mode of the tracking function is an off mode, step S212 may be carried out. Here, the three-dimensional image processing apparatus 100 according to the present disclosure may be in one of the power applied states in the off modes shown in FIGS. 6D, 10D, 12D and 17D. Also, the controller 180 may control the supply of power from the power supply device 190 so that the three-dimensional image processing apparatus 100 is in one of the power applied states in the off modes shown in FIGS. 6D, 10D, 12D and 17D.

Figure 21:
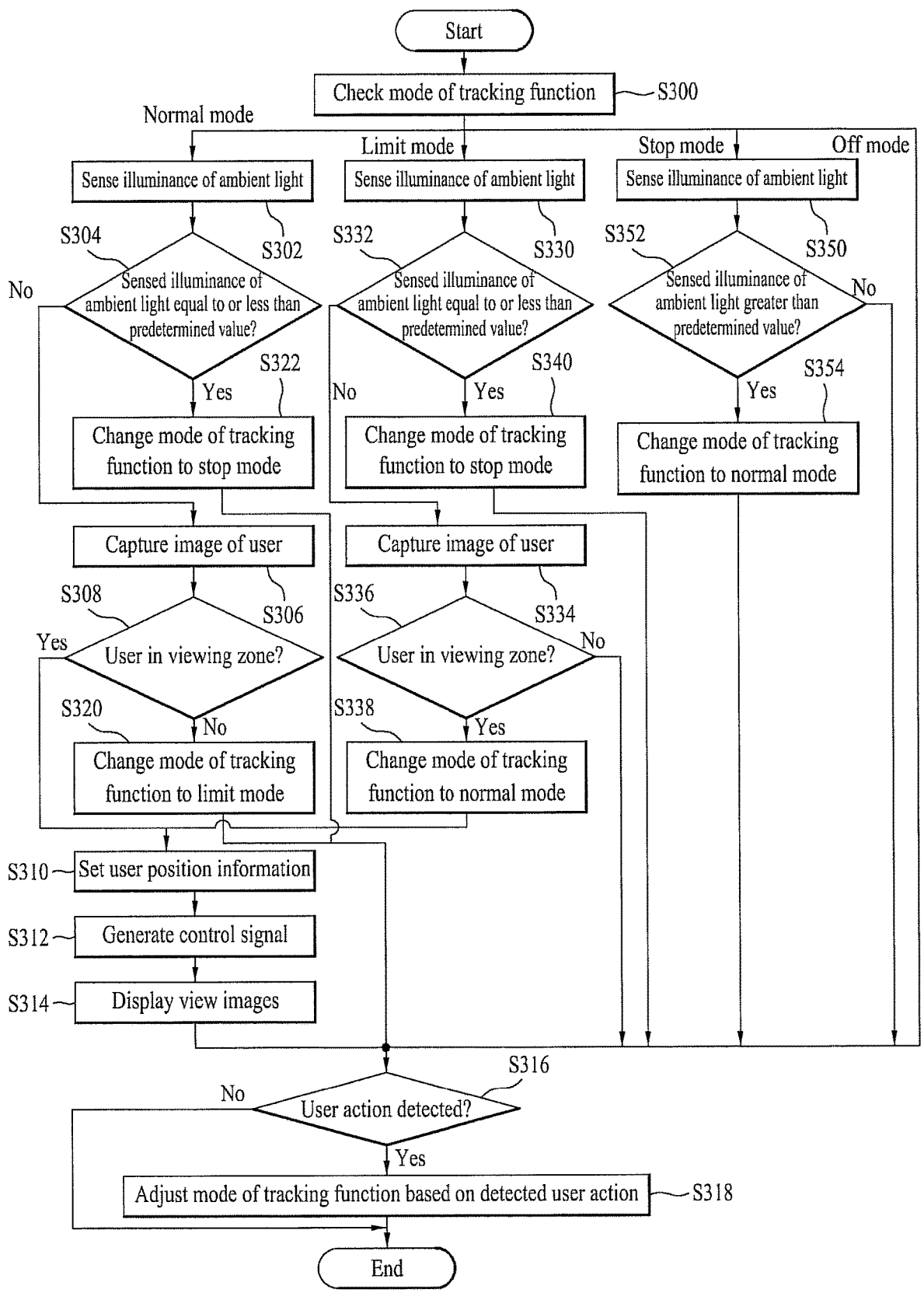
FIG. 21 is a flow chart of a method of controlling a three-dimensional image processing apparatus according to a further embodiment of the present disclosure.

FIG. 21 is a flow chart of a method of controlling a three-dimensional image processing apparatus according to a further embodiment of the present disclosure. The controller 180 may check a mode of the tracking function, in step S300.

In a case in which the mode of the tracking function is a normal mode, the ambient light sensor 143 may sense the illuminance of ambient light, in step S302. Here, the three-dimensional image processing apparatus 100 may be in one of the power applied states in the normal modes shown in FIGS. 6A, 10A, 12A and 17A. Also, the controller 180 may control the supply of power from the power supply device 190 so that the three-dimensional image processing apparatus 100 is in one of the power applied states in the normal modes shown in FIGS. 6A, 10A, 12A and 17A.

The controller 180 may check the illuminance of the ambient light sensed by the ambient light sensor 143, in step S304. Here, the controller 180 may determine whether the illuminance of the ambient light is equal to or less than a predetermined value. Also, the predetermined value may be set by the controller 180 based on at least one selected from among a method of extracting a picture image of a user based on an image captured by the camera 121 or through operation of a capturing element (e.g., sensor) of the camera 121.

Upon determining that the illuminance of the ambient light is greater than the predetermined value, the camera 121 may capture a user image, in step S306. The controller 180 may determine whether the user is in a viewing zone to enable a user to view a three-dimensional image displayed by the three-dimensional image processing apparatus 100 using the image captured by the camera 121, in step S308. Here, step S308 may be carried out by the position detection device 610 shown in FIG. 6, the position detection device 1010 shown in FIG. 10, the position detection device 1210 shown in FIG. 12, and the position detection device 1710 shown in FIG. 17.

Upon determining that the user is in the viewing zone, the controller 180 may set user position information related to a position of the user using the image captured by the camera 121, in step S310. Here, step S310 may be carried out by the position detection device 610 shown in FIG. 6, the position detection device 1010 shown in FIG. 10, the position detection device 1210 shown in FIG. 12, and the position detection device 1710 shown in FIG. 17.

The controller 180 may generate a control signal to control display of view images based on the set user position information, in step S312. Here, step S312 may be carried out by the movement amount calculation device 620 shown in FIG. 6, the movement amount calculation device 1020 shown in FIG. 10, the movement amount calculation device 1240 shown in FIG. 12, and the movement amount calculation device 1740 shown in FIG. 17. Also, the control signal may include at least one selected from among a control signal to control movement of the lens of the lenticular lens board, a control signal to control movement of the non-transmission region of the parallax barrier, and a control signal to control positions at which view images are to be displayed on the display device 151. Also, the mode of the tracking function may include at least one selected from among an off mode in which the tracking function is not executed and an on mode in which the tracking function is executed. The on mode may include at least one selected from among a stop mode in which the execution of the tracking function is stopped, a limit mode in which the tracking function is limitedly executed, and a normal mode in which the tracking function is normally executed. The display device 151 displays the view images, in step S314.

The controller 180 may determine whether a request e.g., user input) to switch between tracking function modes has been detected, in step S316. The request to switch between tracking function modes may be performed through the graphical user interface GUI shown in FIG. 19.

When the user action has been detected, the controller 180 may adjust a mode of the tracking function based on the detected user action, in step S318. When the detected user action requests switching to an off mode, the controller 180 may adjust the mode of the tracking function to the off mode. Also, when the detected user action requests switching to an on mode, the controller 180 adjusts the mode of the tracking function to the on mode. The on mode may be a normal mode.

In some embodiments, when a two-dimensional image is displayed after a three-dimensional image is displayed, the controller 180 may adjust the mode of the tracking function to an off mode. In some embodiments, when a three-dimensional image is displayed after a two-dimensional image is displayed, the controller 180 may automatically adjust the mode of the tracking function to a normal mode.

In some embodiments, when a three-dimensional image is displayed after a two-dimensional image is displayed, the controller 180 may adjust the mode of the tracking function to a predetermined mode. Here, the predetermined mode may be a mode of the tracking function adjusted based on the detected user action.

When the user is determined not to be in the viewing zone, in step S308, the controller 180 may change the mode of the tracking function to a limit mode, in step S320.

When the ambient light sensed in step S302 is determined equal to or less than a predetermined value in step S304, the controller 180 may change the mode of the tracking function to a stop mode, in step S322. In other words, if it is determined that there is insufficient amount of light, the controller 180 changes the operational mode to a stop made to suspend various operations, thereby reducing controller 180 load.

In a case in which the mode of the tracking function is a limit mode, the ambient light sensor 143 may sense the illuminance of ambient light, in step S330. Here, the three-dimensional image processing apparatus 100 may be in one of the power applied states in the limit modes shown in FIGS. 6B, 10B, 12B and 17B. Also, the controller 180 may control the supply of power from the power supply device 190 so that the three-dimensional image processing apparatus 100 is in one of the power applied states in the limit modes shown in FIGS. 6B, 10B, 12B and 17B.

The controller 180 may check the illuminance of the ambient light sensed by the ambient light sensor 143, in step S332. Here, the controller 180 may determine whether the illuminance of the ambient light is equal to or less than a predetermined value.

Upon determining that the illuminance of the ambient light is greater than the predetermined value, the camera 121 may be controlled to capture a user image, in step S334. The controller 180 may determine whether the user is in the viewing zone for viewing a three-dimensional image displayed by the three-dimensional image processing apparatus 100 using the image captured by the camera 121, in step S336. Here, step S336 may be carried out by the position detection device 610 shown in FIG. 6, the position detection device 1010 shown in FIG. 10, the position detection device 1210 shown in FIG. 12, and the position detection device 1710 shown in FIG. 17.

Upon determining that the user is in the viewing zone, the controller 180 changes the mode of the tracking function to a normal mode, in step S338. Here, step S310 may be carried out after step S338 is carried out. In some embodiments, step S316 may be carried out after step S338 is carried out. Moreover, when the user is not in the viewing zone, step S316 may be carried out to detect a user action.

In a case in which the mode of the tracking function is a stop mode, the ambient light sensor 143 may detect the illuminance of ambient light, in step S350. Here, the three-dimensional image processing apparatus 100 may be in one of the power applied states in the stop modes shown in FIGS. 6C, 10C, 12C and 17C. Also, the controller 180 may control the supply of power from the power supply device 190 so that the three-dimensional image processing apparatus 100 is in one of the power applied states in the stop modes shown in FIGS. 6C, 10C, 12C and 17C.

The controller 180 may check the illuminance of the ambient light sensed by the ambient light sensor 143, in step S352. Here, the controller 180 may determine whether the illuminance of the ambient light is greater than a predetermined value. Upon determining that the illuminance of the ambient light is greater than the predetermined value, the controller 180 may change the mode of the tracking function to a normal mode, in step S354.

In a case in which the mode of the tracking function is an off mode, step S315 may be carried out. Here, the three-dimensional image processing apparatus 100 may be in one of the power applied states in the off modes shown in FIGS. 6D, 10D, 12D and 17D. Also, the controller 180 may control the supply of power from the power supply device 190 so that the three-dimensional image processing apparatus 100 is in one of the power applied states in the off modes shown in FIGS. 6D, 10D, 12D and 17D.

Also, the present disclosure may be realized in recording media readable by computers as code readable by the computers. The recording media readable by the computers include all kinds of recording devices to store data readable by the computers. Examples of the recording media readable by the computers include a ROM, a RAM, a CD-ROM, a magnetic tape, a floppy disk, and an optical data storage device. Also, the present disclosure may be realized in the form of a carrier wave (for example, transmission through the Internet). Also, the recording media readable by the computers may be stored in computers connected via a network in a distributed fashion as code readable by the computers so that the computers can execute the code.

As broadly described and embodied herein, the three-dimensional image processing apparatus and the electric power control method of the same may rapidly detect the position of the user through the tracking function and move the sweet spot region to correspond to the sensed position of the user. Hence, the user can experience a three-dimensional effect without feeling fatigue or unnaturalness. Also, in a case in which it is not necessary to detect the position of the user, the three-dimensional image processing apparatus and the electric power control method of the same according to the present disclosure stops the tracking function to prevent power consumption caused by execution of the tracking function, and therefore, it is possible to minimize power consumption of the three-dimensional image processing apparatus.

In one embodiment, a three-dimensional image processing apparatus may include a display configured to display two or more view images, a three-dimensional image filter disposed a prescribed distance from the display to adjust optical paths of the displayed view images, a camera configured to capture an image of a user, and a controller configured to control at least one of the display of the view images, the three-dimensional image filter, or the camera. The controller may determine a position of the user based on the captured image and executes at least one process that adjusts a position of the view images on the display or the optical paths of the displayed view images through the three-dimensional image filter. Moreover, the controller may control an operational state of the camera and the at least one process based on the determined position of the user. The controller may track a movement of the user based on the determined position of the user and adjusts a perceived three-dimensional view of the view images in response to the tracked movement.

An ambient light sensor configured to sense an amount of ambient light may be provided. The controller may control the operational state of the camera and the at least one process for controlling the display of the view images or the three-dimensional image filter based on the sensed amount of ambient light. When the amount of the ambient light is less than or equal to a prescribed value, the controller may stop the operation of the camera, stop the process for determining a position of the user, and stop the at least one of the process that adjusts a position of the view images on the display or a process that controls the three-dimensional image filter to change the optical paths of the displayed view images.

The controller may stop power supplied to the camera to stop the operation of the camera. The prescribed value of ambient light may be set based on at least one of a method of extracting a picture image of the user based on the captured image or a performance of a capturing element of the camera.

When the amount of the ambient light is greater than a prescribed value, the controller may operate the camera to capture the image of the user, execute the process for determining a position of the user, and execute the at least one of the process that adjusts a position of the view images on the display or the process that controls the three-dimensional image filter to change the optical paths of the displayed view images.

The controller may control the operational state to be an off state in which the camera, a process for determining a position of the user, and the at least one of a process that adjusts a position of the view images on the display or a process that controls the three-dimensional image filter to change the optical paths of the displayed images are operational. The controller may control the operational state to be a stop state in which the camera, the process for determining a position of the user, and the at least one of a process that adjusts a position of the view images on the display or a process that controls the three-dimensional image filter to change the optical paths of the displayed images are not operational.

The controller may control the operational state to be a limit state in which the camera and the process for determining the position of the user are operational, and the at least one of a process that adjusts a position of the view images on the display or a process that controls the three-dimensional image filter to change the optical paths of the displayed images are not operational. Moreover, The controller may control the operational state to be a normal state in which the camera, the process for determining the position of the user, and the at least one of a process that adjusts a position of the view images on the display or a process that controls the three-dimensional image filter to change the optical paths of the displayed images are operational.

The three-dimensional image filter may include a lenticular lens board having a plurality of lenses, and the controller controls a movement of the lenses to adjust the optical paths through the three-dimensional image filter. The three-dimensional image filter may include a parallax barrier having transmission regions and non-transmission regions which are alternately formed, and the controller may be configured to control a movement of the non-transmission regions to adjust the optical paths through the three-dimensional image filter.

In this embodiment, the controller may be configured to change locations of the view images displayed on the display. The controller may be configured to change the operational state of the camera and the at least one process based on a detected user action. Moreover, the controller may be configured to determine whether the user is positioned within a viewing zone using the captured image and to adjust the operational state of the camera and the at least one process based on the determined result.

In one embodiment, a three-dimensional image processing apparatus may include a display configured to display two or more view images, a three-dimensional image filter disposed a prescribed distance from the display to adjust optical paths of the displayed view images, a camera configured to capture an image of a user for determining a position of the user, an ambient light sensor to sense an illuminance of ambient light, and a controller configured to control a perceived three-dimensional view of the view images by adjusting the display of the view images or the three-dimensional image filter based on the determined position of the user. The controller may control an operational state of the camera and at least one process for controlling the display of the view images or a process for controlling the three-dimensional image filter based on the sensed illuminance of ambient light.

When the illuminance of the ambient light is less than or equal to a prescribed value, the controller may stop the operation of the camera, the process for determining a position of the user, and the at least one of the process for controlling the display of the view images on the display or the process for controlling the three-dimensional image filter to change the optical paths of the displayed view images.

When the illuminance of the ambient light is greater than a prescribed value, the controller may operate the camera, the process for determining a position of the user, and the at least one of a process controlling the display of the view images on the display or a process for controlling the three-dimensional image filter to change the optical paths of the displayed view images.

The controller may determine whether the user is positioned within a prescribed area relative to the display, and control an operational state of the camera and the at least one processes based on the determined position of the user. When the user is determined to be positioned outside the prescribed area, the controller may power off the camera and prevents execution of the at least one process for adjusting the perceived three-dimensional view based on the position of the user. Moreover, the prescribed area may be a viewing zone for viewing the perceived three-dimensional view of the view images on the display.

In one embodiment, a three-dimensional image processing apparatus may include a display device configured to display two or more view images, a three-dimensional image filter disposed at the front of the display device to adjust optical paths of the displayed view images, a camera configured to capture an image of a user, an ambient light sensor configured to sense an illuminance of ambient light, and a controller configured to execute a tracking function and to adjust a mode of the tracking function based on the sensed illuminance of the ambient light, the tracking function to set user position information related to a position of the user using the captured image and to generate a control signal to control display of the view images based on the set user position information.

The mode of the tracking function may include at least one selected from among an off mode in which the tracking function is not executed, a stop mode in which the execution of the tracking function is stopped, a limit mode in which the tracking function is limitedly executed, and a normal mode in which the tracking function is normally executed. Power may not be supplied to the camera in a case in which the mode of the tracking function is a stop mode in which the execution of the tracking function is stopped.

The controller may adjust the mode of the tracking function to a stop mode in which the execution of the tracking function is stopped in a case in which the illuminance of the ambient light is equal to or less than a predetermined value. Here, the predetermined value may be set based on at least one selected from among a method of extracting a picture image of the user based on the captured image and performance of a capturing element of the camera. The controller may adjust the mode of the tracking function to the normal mode in which the tracking function is normally executed when the illuminance of the ambient light is greater than the predetermined value.

The three-dimensional image filter may include a lenticular lens board having a plurality of lenses or a parallax barrier having transmission regions and non-transmission regions which are alternately formed, and the control signal may include a control signal to control movement of the lenses or a control signal to control movement of the non-transmission regions.

The control signal may include a control signal to control positions of the view images to be displayed on the display device. The controller may adjust the mode of the tracking function based on a detected user action. Moreover, the controller may determine whether the user is in a viewing zone to enable the user to view the displayed view images using the captured image and adjust the mode of the tracking function based on the determined result.

In one embodiment, a three-dimensional image processing apparatus may include a display device configured to display a three-dimensional image comprising two or more view images, a three-dimensional image filter disposed at the front of the display device to adjust optical paths of the displayed view images, a camera configured to capture a viewing zone of the three-dimensional image processing apparatus, and a controller configured to execute a tracking function, to determine whether the user is in the viewing zone using the captured image and to adjust a mode of the tracking function based on the determined result, the tracking function to set user position information related to a position of a user using the captured image and to generate a control signal to control display of the view images based on the set user position information.

In one embodiment, an electric power control method of a three-dimensional image processing apparatus may include checking a mode of a tracking function, capturing an image of a user when the mode of the tracking function is a normal mode, setting user position information related to a position of the user using the captured image and generating a control signal to control display of two or more view images based on the set user position information, sensing the illuminance of ambient light, and adjusting the mode of the tracking function based on the illuminance of the ambient light.

In one embodiment, an electric power control method of a three-dimensional image processing apparatus may include checking a mode of a tracking function, capturing a viewing zone of the three-dimensional image processing apparatus when the mode of the tracking function is a normal mode, setting user position information related to a position of a user using the captured image and generating a control signal to control display of two or more view images based on the set user position information, determining whether the user is in the viewing zone using the captured image, and adjusting the mode of the tracking function based on the determined result.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A three-dimensional image processing apparatus comprising:
   a display displaying two or more view images;
   a three-dimensional image filter disposed a prescribed distance from the display to adjust optical paths of the displayed view images;
   a camera capturing an image of a user positioned within a viewing zone where the user views a three-dimensional image;
   an ambient light sensor sensing illuminance of ambient light; and
   a controller controlling at least one of the display of the view images, the three-dimensional image filter, or the camera, and the controller including a position detection device, a movement amount calculation device and a communication controller or a graphic processing unit,
   wherein the controller controls the camera to be driven at a predetermined frame rate or more irrespective of illuminance of the ambient light, and the controller is to determine the frame rate such that the three-dimensional image filter is to move before the user is to exit the viewing zone,
   wherein the controller determines a position of the user based on the captured image and executes at least one process that adjusts a position of the view images on the display or the optical paths of the displayed view images through the three-dimensional image filter,
   wherein the controller controls an operational state of the camera and the at least one process based on the determined position of the user,
   wherein the controller executes a tracking function and adjusts a mode of the tracking function based on the sensed illuminance of ambient light and by a request of the user depending upon whether the user is in the viewing zone, and the mode of the tracking function includes an off mode in which the tracking function is not executed and an on mode in which the tracking function is executed,
   wherein the operational state includes a stop mode, a limit mode, and a normal mode:
      the stop mode is a mode in which the camera, the process for determining a position of the user, and the at least one of a process that adjusts a position of the view images on the display or a process that controls the three-dimensional image filter to change the optical paths of the displayed viewed images are not operational,
      the limit mode is a mode in which the camera and the process for determining the position of the user are operational, and the at least one of a process that adjusts a position of the view images on the display or a process that controls the three-dimensional image filter to change the optical paths of the displayed view images are not operational, and
      the normal mode is a mode in which the camera, the process for determining the position of the user, and the at least one of a process that adjusts a position of the view images on the display or a process that controls the three-dimensional image filter to change the optical paths of the displayed view images are operational,
   wherein the controller controls the three-dimensional image filter to change the optical paths of the displayed view images based on the sensed amount of ambient light,
   wherein power is not supplied to the movement amount calculation device in the limit mode, and
   wherein the frame rate is determined based on a delay time including a first delay time caused by the camera capture.

2. The three-dimensional image processing apparatus of claim 1, wherein the controller tracks a movement of the user based on the determined position of the user and adjusts a perceived three-dimensional view of the view images in response to the tracked movement.

3. The three-dimensional image processing apparatus of claim 1, wherein the controller controls the operational state of the camera and the display of the view images.

4. The three-dimensional image processing apparatus of claim 3, wherein, when the amount of the ambient light is less than or equal to a prescribed value, the controller stops the operation of the camera, stops the process for determining a position of the user, and stops the at least one of the process that adjusts a position of the view images on the display or a process that controls the three-dimensional image filter to change the optical paths of the displayed view images.

5. The three-dimensional image processing apparatus of claim 4, wherein the controller stops power supplied to the camera to stop the operation of the camera.

6. The three-dimensional image processing apparatus of claim 4, wherein the prescribed value of ambient light is set based on at least one of a method of extracting a picture image of the user based on the captured image or a performance of a capturing element of the camera.

7. The three-dimensional image processing apparatus of claim 3, wherein, when the amount of the ambient light is greater than a prescribed value, the controller operates the camera to capture the image of the user, executes the process for determining a position of the user, and executes the at least one of the process that adjusts a position of the view images on the display or the process that controls the three-dimensional image filter to change the optical paths of the displayed view images.

8. The three-dimensional image processing apparatus of claim 1, wherein the three-dimensional image filter includes a lenticular lens board having a plurality of lenses, and the controller controls a movement of the lenses to adjust the optical paths through the three-dimensional image filter.

9. The three-dimensional image processing apparatus of claim 1, wherein the three-dimensional image filter includes a parallax barrier having transmission regions and non-transmission regions which are alternately formed, and the controller controls a movement of the non-transmission regions to adjust the optical paths through the three-dimensional image filter.

10. The three-dimensional image processing apparatus of claim 1, wherein the controller changes locations of the view images displayed on the display.

11. The three-dimensional image processing apparatus of claim 1, wherein the controller changes the operational state of the camera and the at least one process based on a detected user action.

12. The three-dimensional image processing apparatus of claim 1, wherein the controller determines whether the user is positioned within the viewing zone using the captured image and to adjust the operational state of the camera and the at least one process based on the determined result.

13. The three-dimensional image processing apparatus of claim 1, wherein the tracking function sets a user position information related to a position of the user using the captured image and to generate a control signal to control display of the view images based on the set user position information.

14. The three-dimensional image processing apparatus of claim 1, wherein the frame rate is determined further based on a second delay time, and the second delay time is a delay taken until the controller receives the image frames in which the change in position of the user has been captured, and generates a control signal using the received image frames for driving the three-dimensional image filter.

15. The three-dimensional image processing apparatus of claim 14, wherein the second delay time further includes a delay until the generated control signal is input to a driving device of the three-dimensional image filter.

* * * * *